United States Patent
Tomoda et al.

(10) Patent No.: US 10,546,516 B2
(45) Date of Patent: Jan. 28, 2020

(54) DISPLAY APPARATUS, DISPLAY MODULE, AND DISPLAY MEMBER

(71) Applicant: SONY CORPORATION, Tokyo (JP)

(72) Inventors: Katsuhiro Tomoda, Kanagawa (JP); Akiyoshi Aoyagi, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 55 days.

(21) Appl. No.: 15/127,519

(22) PCT Filed: Feb. 23, 2015

(86) PCT No.: PCT/JP2015/055035
§ 371 (c)(1),
(2) Date: Sep. 20, 2016

(87) PCT Pub. No.: WO2015/151648
PCT Pub. Date: Oct. 8, 2015

(65) Prior Publication Data
US 2017/0140679 A1    May 18, 2017

(30) Foreign Application Priority Data

Mar. 31, 2014  (JP) ................. 2014-071013

(51) Int. Cl.
*G09F 9/302* (2006.01)
*G06F 3/14* (2006.01)
(Continued)

(52) U.S. Cl.
CPC ............ *G09F 9/3026* (2013.01); *G06F 3/147* (2013.01); *G06F 3/1446* (2013.01);
(Continued)

(58) Field of Classification Search
CPC .................. G09F 9/3026; G09G 3/3208; G09G 2310/08; G09G 2300/0439;
(Continued)

(56) References Cited

U.S. PATENT DOCUMENTS 5,106,197 A * 4/1992 Ohuchida ................. G09F 9/35
349/122
5,808,710 A * 9/1998 Pierson ............... G02F 1/13336
349/149
5,812,226 A * 9/1998 Izumi .................. G02F 1/13336
349/73

(Continued)

FOREIGN PATENT DOCUMENTS

JP      2000-105551 A      4/2000
JP      2001-176668 A      6/2001
(Continued)

*Primary Examiner* — Christopher E Leiby
(74) *Attorney, Agent, or Firm* — Chip Law Group

(57) ABSTRACT

When display panels are arranged to form a tiled-type display apparatus, the precision of the spaces between adjacent display panels is to be increased, and display quality is to be enhanced. A display apparatus includes display panels and space forming members. Pixels are arranged on the display panels. Space forming members are disposed between a display panel and a display panel, and form a space between the display panels. As spaces are formed by the space forming members, the spaces between the display panels are prevented from changing. Thus, appearances of joints are also prevented.

18 Claims, 22 Drawing Sheets

(51) Int. Cl.
*G06F 3/147* (2006.01)
*G09G 3/3208* (2016.01)

(52) U.S. Cl.
CPC ..... *G09G 3/3208* (2013.01); *G09G 2300/026* (2013.01); *G09G 2300/0439* (2013.01); *G09G 2310/08* (2013.01); *G09G 2330/02* (2013.01)

(58) Field of Classification Search
CPC .......... G09G 2300/026; G09G 2330/02; G06F 3/147; G06F 3/1446
See application file for complete search history.

(56) References Cited

U.S. PATENT DOCUMENTS

| | | | | |
|---|---|---|---|---|
| 6,005,649 | A * | 12/1999 | Krusius | G02F 1/13336 349/20 |
| 6,181,405 | B1 * | 1/2001 | Izumi | G02F 1/13336 349/153 |
| 6,491,560 | B1 * | 12/2002 | Whalin | G02F 1/13336 29/843 |
| 6,677,918 | B2 * | 1/2004 | Yuhara | G09F 9/33 345/1.3 |
| 6,759,660 | B2 * | 7/2004 | Izumi | G02F 1/13336 250/370.01 |
| 7,443,096 | B2 * | 10/2008 | Kobayashi | H01L 27/3276 313/498 |
| 8,702,048 | B2 * | 4/2014 | Kludt | F16B 2/12 248/222.14 |
| 9,040,829 | B2 * | 5/2015 | Milne | G06F 3/044 136/244 |
| 9,047,791 | B2 * | 6/2015 | Cox | G09F 27/008 |

FOREIGN PATENT DOCUMENTS

| | | |
|---|---|---|
| JP | 2002-244592 A | 8/2002 |
| JP | 2003-337579 A | 11/2003 |
| JP | 2005-331834 A | 12/2005 |
| JP | 2006-163325 A | 6/2006 |
| JP | 2007-279492 A | 10/2007 |
| JP | 2010-085940 A | 4/2010 |
| JP | 2010-281911 A | 12/2010 |
| JP | 2011-047977 A | 3/2011 |

\* cited by examiner a b a b a b a b a b a b a b c

DISPLAY APPARATUS, DISPLAY MODULE, AND DISPLAY MEMBER

CROSS REFERENCE TO RELATED APPLICATIONS

This application is a U.S. National Phase of International Patent Application No. PCT/JP2015/055035 filed on Feb. 23, 2015, which claims priority benefit of Japanese Patent Application No. 2014-071013 filed in the Japan Patent Office on Mar. 31, 2014. Each of the above-referenced applications is hereby incorporated herein by reference in its entirety.

TECHNICAL FIELD

The present technology relates to a display apparatus, a display module, and a display member. More particularly, the present technology relates to a display apparatus including display panels that perform displaying with two-dimensionally arranged light emitting elements, a display module, and a display member.

BACKGROUND ART

When a large-screen display apparatus is manufactured by a conventional method, small-sized display panels are combined to form a large-screen display apparatus. In the small-sized display panels, light emitting elements such as organic electro luminescence (EL) elements are used as pixels. Such a display apparatus is called a tiled-type display apparatus.

For example, a tiled-type display apparatus in which display panels using organic EL elements are disposed on the same base has been suggested. In this display apparatus, protrusions formed on the back surfaces of the display panels are engaged with fitting holes of the base, so that each display panels is positioned (see Patent Document 1, for example).

CITATION LIST

Patent Document

Patent Document 1: Japanese Patent Application Laid-Open No. 2011-47977

SUMMARY OF THE INVENTION

Problems to be Solved by the Invention

By the above described conventional technique, the precision of the positioning at the time when the display panels are positioned depends on the mechanical precision of the protrusions of the display panels and the fitting holes of the base, and on the precision of the engagement. Therefore, high-precision positioning cannot be performed. In a case where a tiled-type display apparatus is formed with such display panels, the spaces between adjacent display panels do not stabilize, and the pitch of the pixels between which the spaces are formed varies. As a result, the spaces are visually recognized as seams of the display panels or as joints, and display quality is degraded.

The present technology has been developed in view of those circumstances, and aims to increase the precision of the spaces between adjacent display panels when display panels are arranged to form a tiled-type display apparatus, and thus enhance display quality.

Solutions to Problems

The present technology has been developed to solve the above problems, and a first aspect thereof is a display apparatus that includes: display members having pixels arranged thereon; and a space forming member that is disposed between the display members and forms a space between the display members. With this, spaces are effectively formed between the display members.

In addition, in the first aspect, the pitch of the pixels between which the space between adjacent ones of the display members exists may be substantially equal to the pitch of the pixels within the display members. With this, the spaces between the pixels in the entire display apparatus, including the joining portions of the adjacent display members, become uniform.

In addition, in the first aspect, the space forming member may be in contact with the display members at points or surfaces. With this, the space forming member is in contact with the display members at points or surfaces.

In addition, in the first aspect, the surfaces at which the space forming member is in contact with the display members may be curved surfaces when seen from the display surfaces of the display members, and one joining surface may form a recess while the other joining surface forms a protrusion. With this, the contact areas can be made relatively large.

In addition, in the first aspect, the surfaces at which the space forming member is in contact with the display members may have arc-like shapes with substantially the same curvature radii when seen from the display surfaces of the display members. With this, the space forming member is in contact with the display members at arc-like surfaces.

In addition, in the first aspect, the surfaces at which the space forming member is in contact with the display members may have arc-like shapes with curvature radii not greater than 1 mm when seen from the display surfaces of the display members. With this, the contact surfaces are arc-like surfaces with curvature radii not greater than 1 mm when seen from the display surfaces of the display members.

In addition, in the first aspect, the surfaces at which the space forming member is in contact with the display members may be formed between the pixels arranged on the outermost peripheries of the display members. With this, the surfaces at which the space forming member is in contact with the display members are disposed between the pixels arranged on the outermost peripheries of the display members.

In addition, in the first aspect, a sealing resin may be provided between the display members having the space formed in between by the space forming member. With this, the space between the panels is sealed with the resin.

In addition, in the first aspect, the space forming member may not protrude from the display surfaces of the display members. With this, the space forming member does not protrude from the display surfaces of the display members.

In addition, in the first aspect, the space forming member may have a thermal conduction member. With this, a heat release path is formed.

In addition, in the first aspect, the space forming member may have a conductive member, and transmit an electrical signal to be supplied to the display members. With this, an electrical signal transmission path is formed.

In addition, in the first aspect, the display members may perform displaying in accordance with a first signal transmitted through the space forming member, and a second signal transmitted through a member other than the space forming member. With this, signals are transmitted through two paths.

In addition, in the first aspect, the first signal may include an image signal, a clock signal, or a power supply signal for the display members. With this, an image signal, a clock signal, or a power supply signal is transmitted through the space forming member.

In addition, in the first aspect, the display apparatus may further include a supporting member that supports the display members, and the supporting member may include a drive circuit unit that generates the first signal and the second signal for the display members. With this, a drive circuit unit is provided near the display members.

In addition, in the first aspect, the second signal may be transmitted from the drive circuit unit to each of the display members. With this, the second signal is transmitted from the drive circuit unit directly to the display members.

In addition, a second aspect of the present technology is a display module that includes: display units each including: display members having pixels arranged thereon; a space forming member that is disposed between the display members and forms a space between the display members; and a supporting member that supports the display members; and a joining member that joins the supporting members of the display units to each other, the joining member including a thermal conduction portion. With this, a heat release path is formed in the display module.

In addition, a third aspect of the present technology is a display member that includes: a display surface having pixels arranged thereon, the pixels constituting the display member; and a side surface of the display surface, recesses being formed in the side surfaces, the recesses being to be brought into contact with a space forming member that forms a space between display members. With this, recesses for contacting with the space forming member are formed.

In addition, in the third aspect of the present technology, the recesses may each have a conductive member, and transmit an electrical signal to be supplied from the space forming member to the display member. With this, an electrical signal is supplied from the space forming member to the display member.

In addition, in the third aspect of the present technology, the display member may perform displaying in accordance with a first signal transmitted through the recesses, and a second signal transmitted through a member other than the recesses. With this, signals are transmitted through two paths.

In addition, in the third aspect of the present technology, the recesses of the display member may be in contact with the space forming member at surfaces. With this, the space forming member is in contact with the display member at surfaces.

Effects of the Invention

According to the present technology, the precision of spaces between adjacent display panels can be increased when display panels are arranged to form a tiled-type display apparatus, and thus, display quality can be enhanced. Note that the effects of the present technology are not limited to the effects described herein, and may include any of the effects described in the present disclosure.

MODES FOR CARRYING OUT THE INVENTION

The following is a description of modes for carrying out the present technology (the modes will be hereinafter referred to as the embodiments). Explanation will be made in the following order.

1. First embodiment (an example case where non-conductive space forming members are used)
2. Second embodiment (an example case where conductive space forming members are used)
3. Modifications

1. First Embodiment

Configuration of a Display Apparatus

Figure 1:
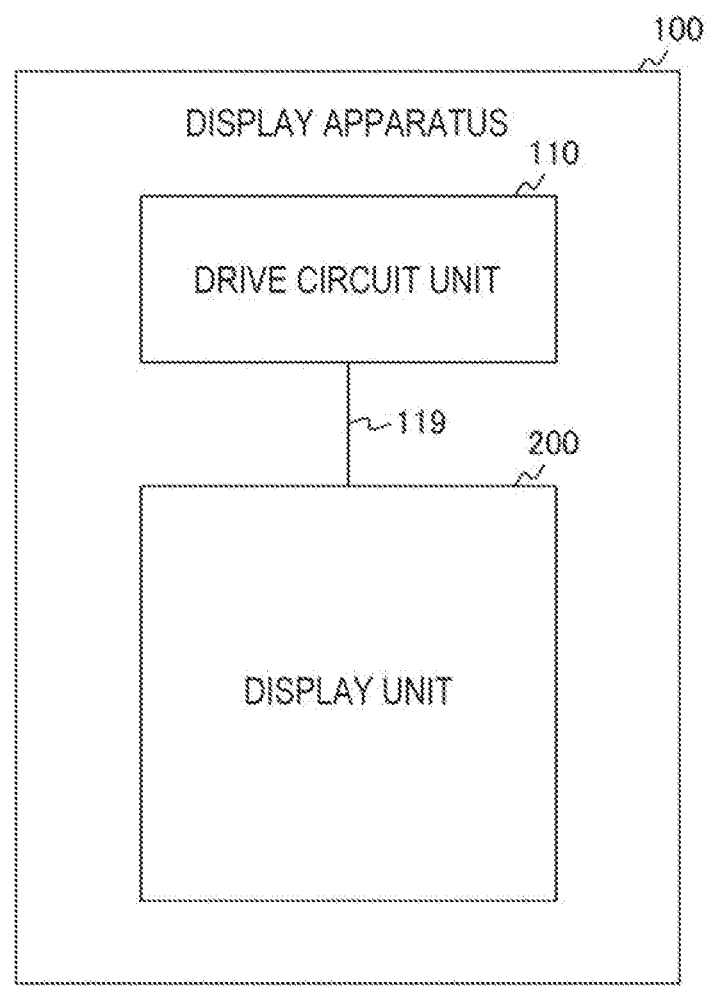
FIG. 1 is a diagram showing an example configuration of a display apparatus according to a first embodiment of the present technology.

FIG. 1 is a diagram showing an example configuration of a display apparatus according to a first embodiment of the present technology. The display apparatus 100 in the drawing includes a drive circuit unit 110, a signal cable 119, and a display unit 200. The drive circuit unit 110 drives the display unit 200. On the basis of an image data signal that is input from an external control device or the like, the drive circuit unit 110 generates and outputs a signal for driving the display unit 200. The signal cable 119 connects the drive circuit unit 110 and the display unit 200, and transmits electrical signals. A signal cable formed with a flexible wiring board, for example, can be used as the signal cable 119. The display unit 200 performs displaying on the basis of a signal that is output from the drive circuit unit 110.

Configuration of the Display Unit

Figure 2:
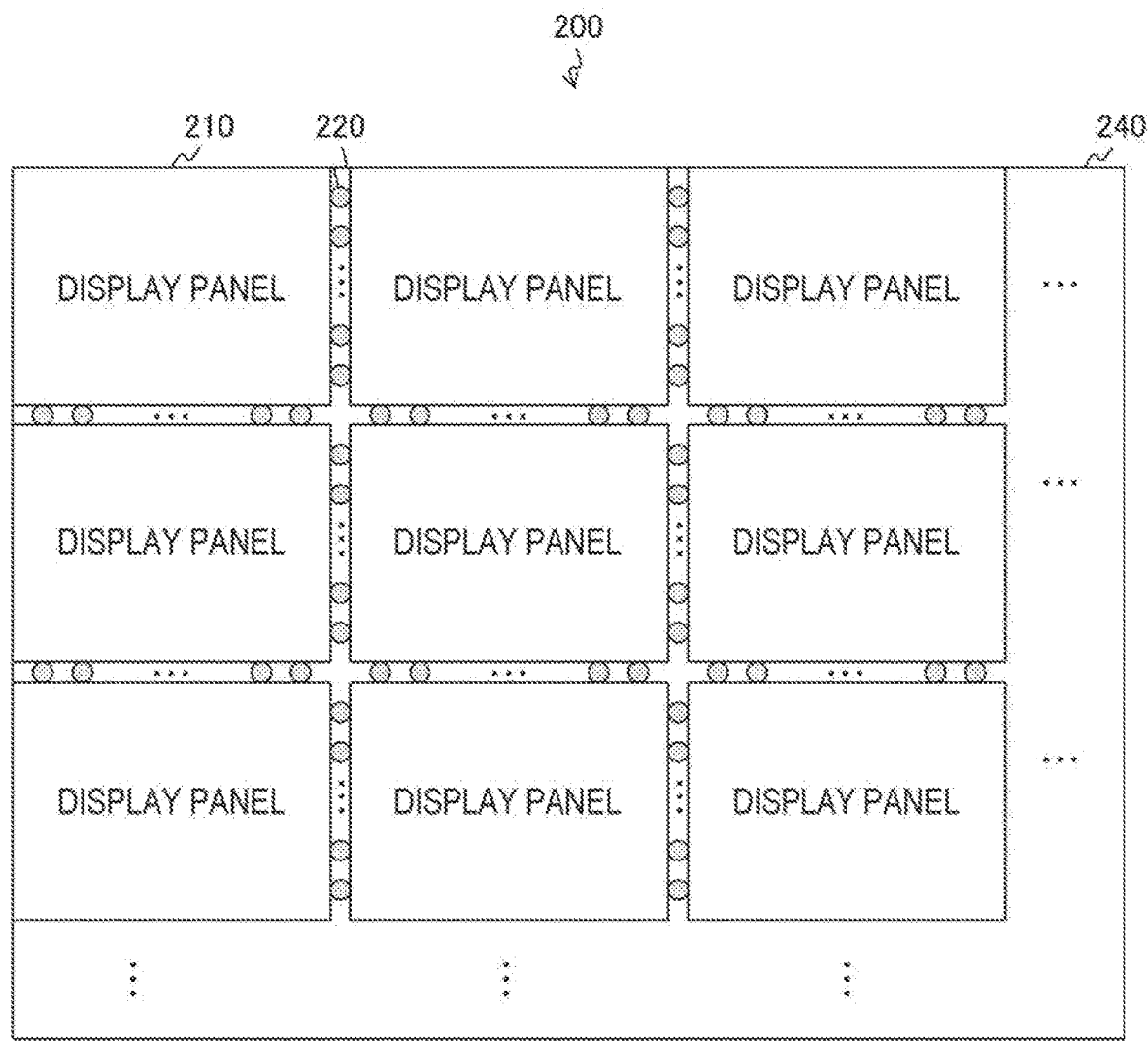
FIG. 2 is a diagram showing an example configuration of a display unit according to the first embodiment of the present technology.
Figure 2:
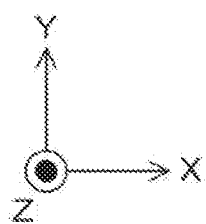

FIG. 2 is a diagram showing an example configuration of the display unit according to the first embodiment of the present technology. The display unit 200 in the drawing includes display panels 210, space forming members 220, and a support substrate 240. Each display panel 210 is a panel in the smallest unit to perform displaying. The display panels 210 are arranged in a two-dimensional lattice, to form a tiled-type display apparatus. The space forming members 220 are designed to form spaces between the two-dimensionally arranged display panels 210. The space forming members 220 may be spherical resin members, for example. The support substrate 240 supports the display panels 210 and the space forming members 220. This support substrate may be a substrate made of a metal, such as aluminum. Note that the display panels 210 are an example of the display members of the claims. Each space forming member 220 is an example of the space forming member of the claims. The support substrate 240 is an example of the supporting member of the claims.

Figure 3:
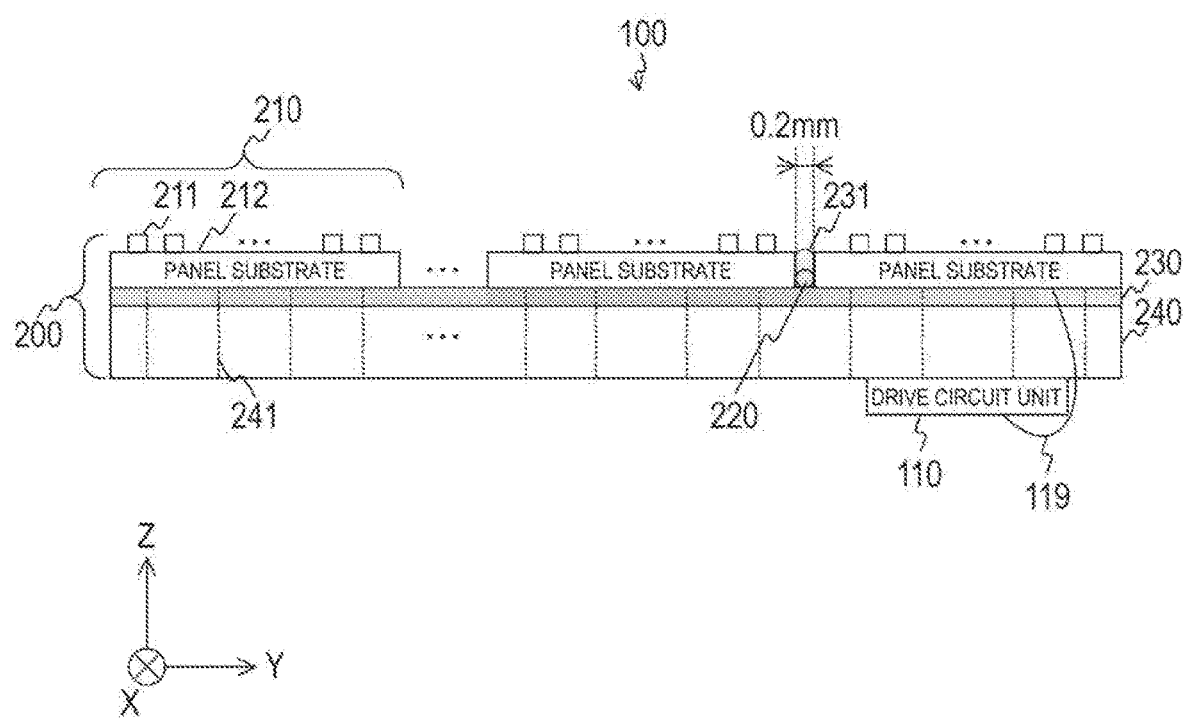
FIG. 3 is a cross-sectional view of the example configuration of the display apparatus according to the first embodiment of the present technology.

FIG. 3 is a cross-sectional view of the example configuration of the apparatus according to the first embodiment of the present technology. The display unit 200 in the drawing includes an adhesive 230 and a sealing resin 231, as well as the display panels 210, the space forming members 220, and the support substrate 240, which have been mentioned above. In addition, the display panels 210 each include a panel substrate 212 and pixels 211. The configuration of each of the display panels 210 will be described later. The adhesive 230 is provided between the support substrate 240 and the panel substrates 212 of the display panels 210, and bonds these panel substrates to the support substrate 240. This adhesive 230 may be formed with a resin that has both photo-curable properties and thermosetting properties. The sealing resin 231 is a resin that is disposed between the panel substrates 212, and seals the portions between the panel substrates 212. The sealing resin 231 can be formed with the same resin as the resin used as the adhesive 230, for example. As the portions between the panel substrates 212 are sealed with the sealing resin 231, penetration of water from outside can be prevented, and the arranged space forming members 220 can be secured. Note that the sealing resin 231 is an example of the resin of the claims.

In FIG. 3, each space forming member 220 is a sphere of 0.2 mm in diameter. The space forming members 220 are in contact with the panel substrates 212 at points or surfaces, and spaces are formed between the panel substrates 212, so that each distance between the display panels 210 is 0.2 mm. The precision of the distances is determined by the dimensional precision of the space forming members 220. In view of this, spherical spacers that have been widely used as spacers for controlling gaps between liquid crystal panels can be used as the space forming members 220. This is because such spacers have a high degree of dimensional precision In FIG. 3, the drive circuit unit 110 is disposed on the back surface of the support substrate 240. In addition, the support substrate 240 has openings 241 at portions located immediately below the respective display panels 210. The signal cable 119 is connected to a connector of a panel substrate 212 through an opening 241. Note that the drive circuit unit 110 is an example of the drive circuit unit of the claims.

Figure 4:
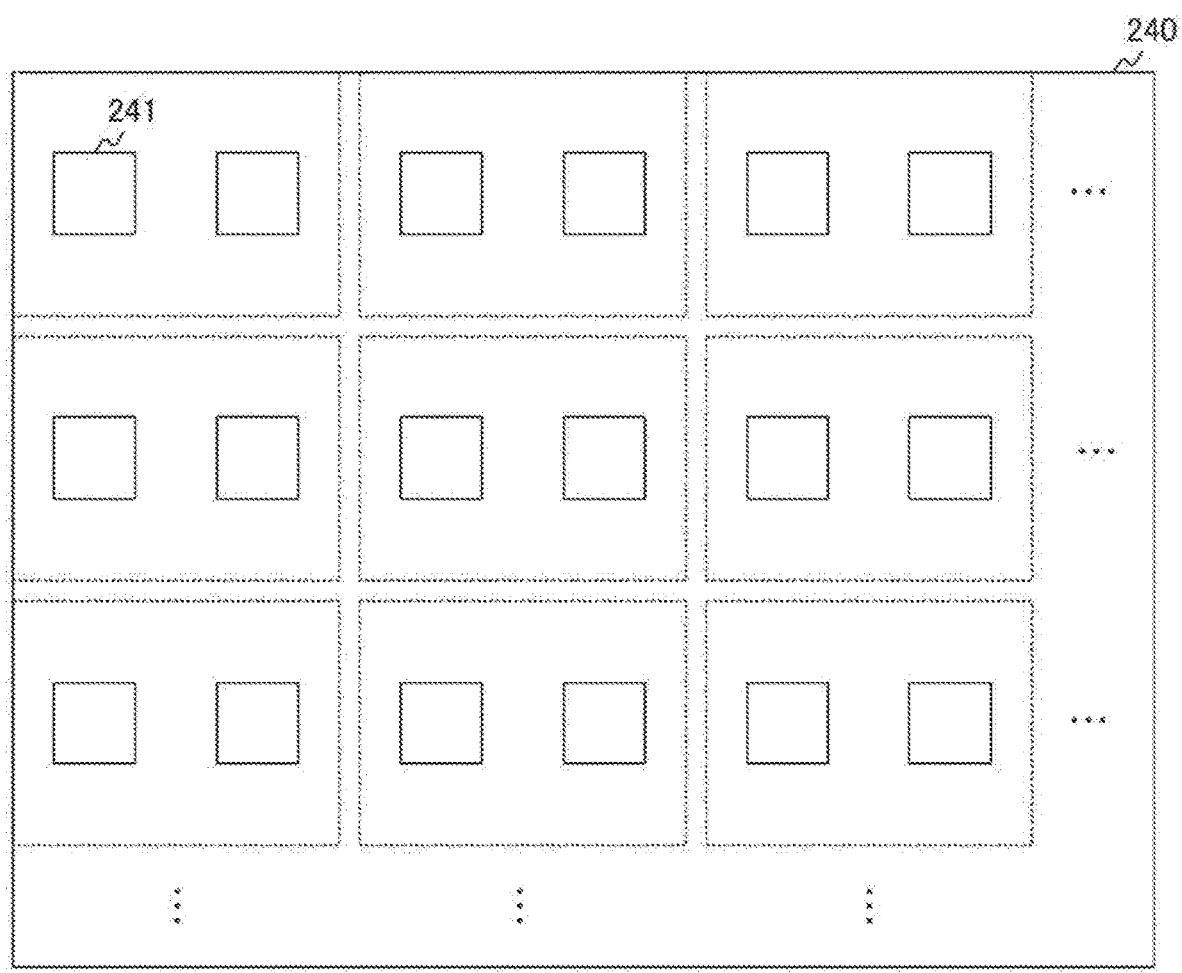
FIG. 4 is a diagram showing an example configuration of a support substrate according to the first embodiment of the present technology.

FIG. 4 is a diagram showing an example configuration of the support substrate according to the first embodiment of the present technology. In the drawing, the rectangular portions indicated by dashed lines on the support substrate 240 show the positions in which the display panels 210 are disposed. The support substrate 240 has two openings 241 for each of the display panels 210.

Configuration of a Display Panel

Figure 5:
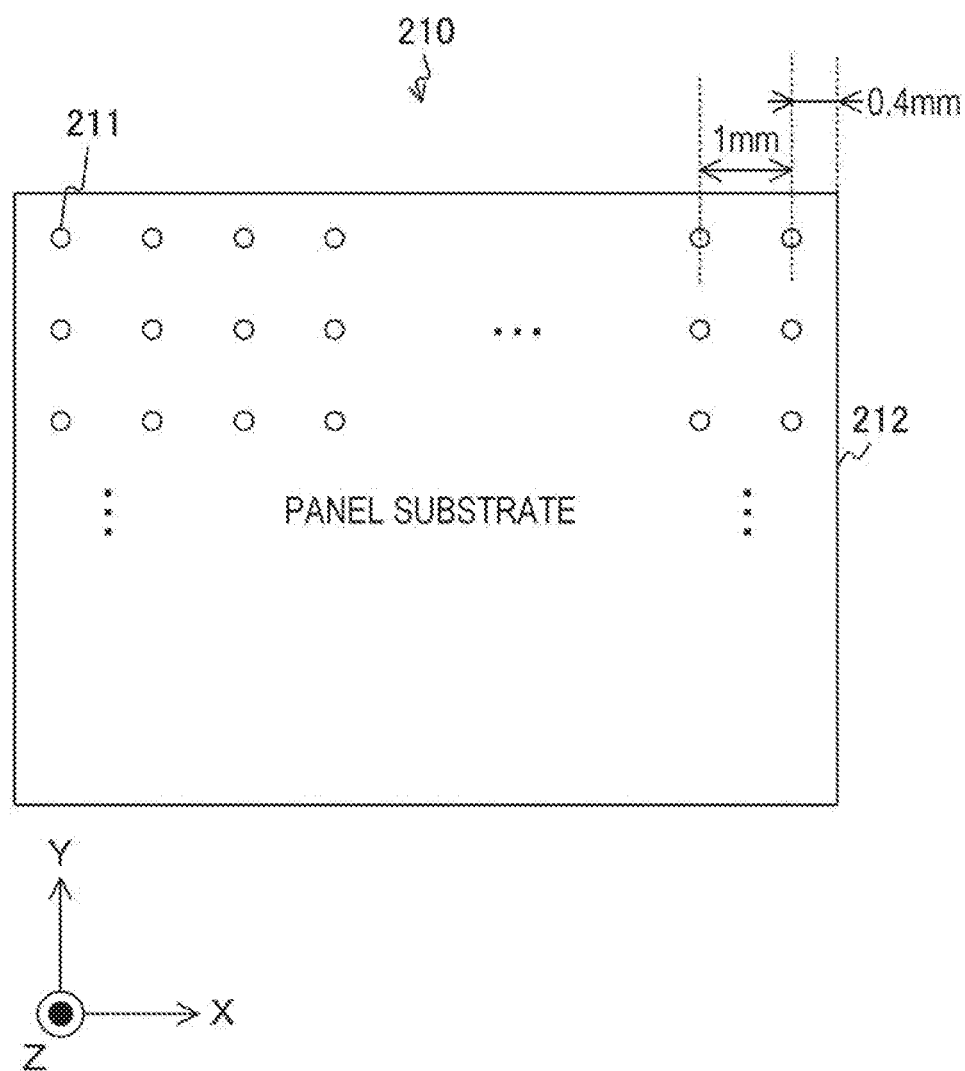
FIG. 5 is a top view of an example configuration of a display panel according to the first embodiment of the present technology.

FIG. 5 is a top view of an example configuration of a display panel according to the first embodiment of the present technology. The display panel 210 in the drawing includes pixels 211 and a panel substrate 212. The pixels 211 each includes a light emitting element, and emits light for displaying. These pixels 211 are two-dimensionally arranged on the panel substrate 212. Each light emitting element may be an LED, for example. Electrical wiring lines for transmitting electrical signals to the light emitting elements are provided in the pixels 211, and these electrical wiring lines are connected to terminal portions (not shown).

The panel substrate 212 is the substrate on which the pixels 211 are arranged. This panel substrate 212 may be formed with a substrate made of a glass-containing epoxy resin or glass, for example. Furthermore, Electrical wiring lines for transmitting electrical signals for driving the pixels 211 are further formed on the panel substrate 212. These electrical wiring lines may be formed with a copper foil pattern, for example. This copper foil pattern is electrically connected to terminal portions of the pixels 211 by soldering, for example. In addition, the panel substrate 212 also includes a connector (not shown) for introducing electrical signals that are input from outside.

In FIG. 5, the pixels 211 are two-dimensionally arranged at a pitch of 1 mm on the panel substrate 212. In addition, the distance between an outermost pixel 211 and an end face of the panel substrate 212 is 0.4 mm.

As described above, according to the first embodiment of the present technology, the space forming members 220 form spaces between adjacent display panels, and accordingly, the precision of the spaces between the adjacent display panels can be made higher. As a result, display quality can be increased. In addition, when the ambient temperature changes, and the sizes of the support substrate 240 and the panel substrates 212 change, the display unit 200 might bend. Since the support substrate 240 made of a metal has a higher thermal expansion coefficient than the panel substrates 212 made of resin or glass, the support substrate 240 expands by a larger amount when the ambient temperature increases, for example. As a result, the display unit 200 bends to the side of the surface on which the panel substrates 212 are arranged. Even in such a case, the spaces between the panel substrates 212 are kept by the space forming members 220, and thus, decreases in the distance between the panel substrates 212 can be limited. As a result, the spaces will not be visually recognized as joints, and a decrease in display quality can be prevented.

2. Second Embodiment

The above described space forming members 220 are not electrically conductive, and electrical signals between the panel substrates need to be transmitted through signal cables. In a second embodiment of the present technology, on the other hand, conductive space forming members are used.

Configuration of a Display Apparatus

Figure 6:
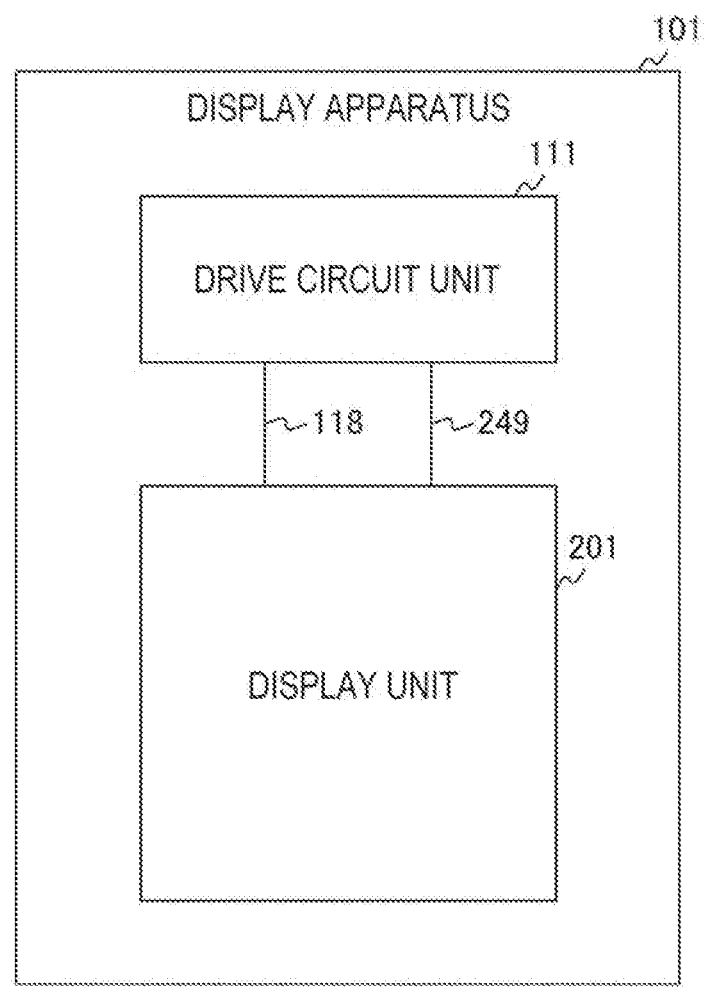
FIG. 6 is a diagram showing an example configuration of a display apparatus according to a second embodiment of the present technology.

FIG. 6 is a diagram showing an example configuration of a display apparatus according to the second embodiment of the present technology. The display apparatus 101 in the drawing includes a drive circuit unit 111, a display unit 201, and signal cables 118 and 249. The display apparatus 101 in the drawing differs from the display apparatus 100 described above with reference to FIG. 1, in using two signal cables.

Configuration of the Display Unit

Figure 7:
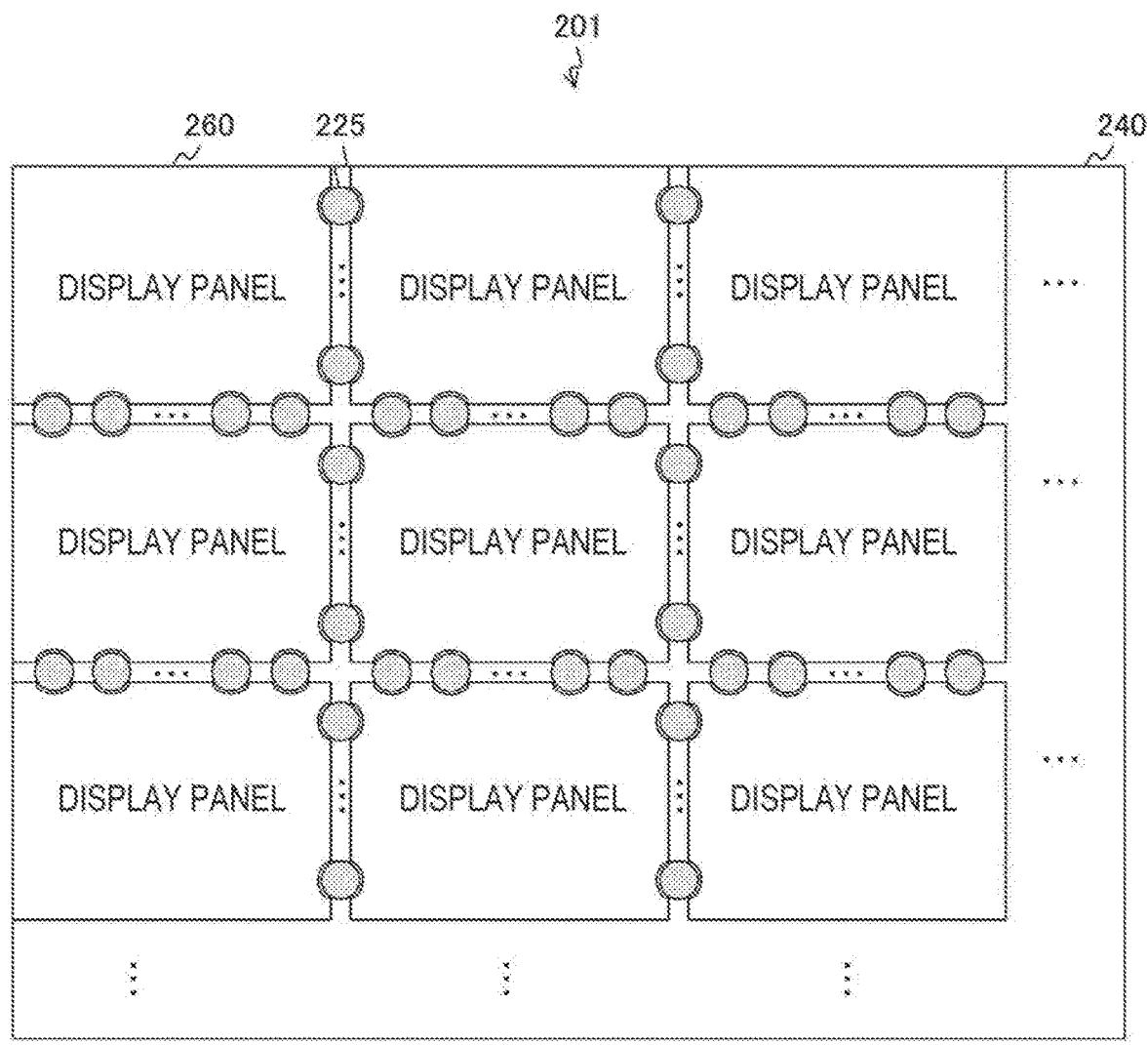
FIG. 7 is a diagram showing an example configuration of a display unit according to the second embodiment of the present technology.

FIG. 7 is a diagram showing an example configuration of the display unit according to the second embodiment of the present technology. The display unit 201 in the drawing includes display panels 260, space forming members 225, and a support substrate 240. The display unit 201 in the drawing differs from the display unit 200 described above with reference to FIG. 2, in using the display panels 260 and the space forming members 225.

Configurations of a Panel Substrate and a Space Forming Member

Figure 8:
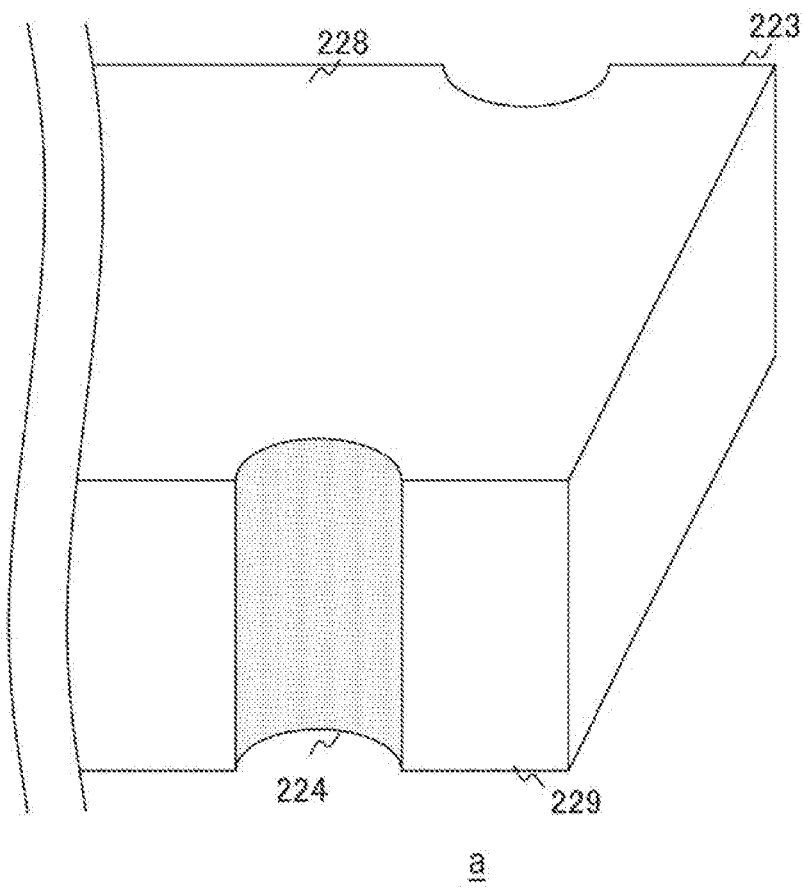
FIG. 8 is a diagram showing the configurations of a panel substrate and a space forming member according to the second embodiment of the present technology.
Figure 8:
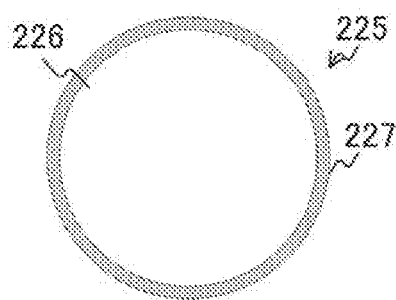

FIG. 8 is a diagram showing the configurations of a panel substrate and a space forming member according to the second embodiment of the present technology. In the drawing, (a) is a perspective view of an example configuration of a panel substrate 223 to be used in a display panel 260. In the drawing, (b) is a cross-sectional view of the configuration of a space forming member 225 to be used in a display panel 260. The panel substrate 223 includes a display surface 228, side surfaces 229, and recesses 224 to be in contact with space forming members 225. These recesses 224 each have an arc-like shape when seen from above the panel substrate 223. In addition, the surface of each recess is coated with a conductive coating film. The conductive coating film may be a coating film made of a metal, such as gold or copper. The space forming member 225 is formed with a spherical particle 226 having its surface coated with a conductive coating film 227. The particle 226 may be a spherical spacer, like each of the space forming members 220. The conductive coating film 227 may be a coating film made of a metal, such as gold.

As the recesses 224 and the space forming members 225 are brought into contact, electrical connections can be obtained. In the second embodiment of the present technology, the recesses 224 and the space forming members 225 are used as the paths for transmitting electrical signals.

In addition, in a case where the coating film 227 is made of a metal such as gold, the space forming members 225 have a high thermal conductivity, and thus, achieve a heat release effect. In a tiled-type display apparatus, heat generation accompanying display becomes a problem. In a tiled-type display apparatus, there normally is a difference in heat release properties between the central portion of the screen and the peripheral portions, and therefore, the temperature is not uniform in the apparatus. As a result, a problem such as a bend of the screen is caused. However, with the space forming members 225 each having the above described coating film 227, the heat at the central portion of the screen can be quickly scattered to the peripheral portions, and a bend can be prevented.

Other than the above, the configuration of each display panel 260 can be similar to the configuration of each display panel 210. Note that the display panels 260 are an example of the display members of the claims. The recesses 224 are an example of the recesses of the claims. Each space forming member 225 having the coating film 227 is an example of the space forming member of the claims.

Configuration of a Display Panel

Figure 9:
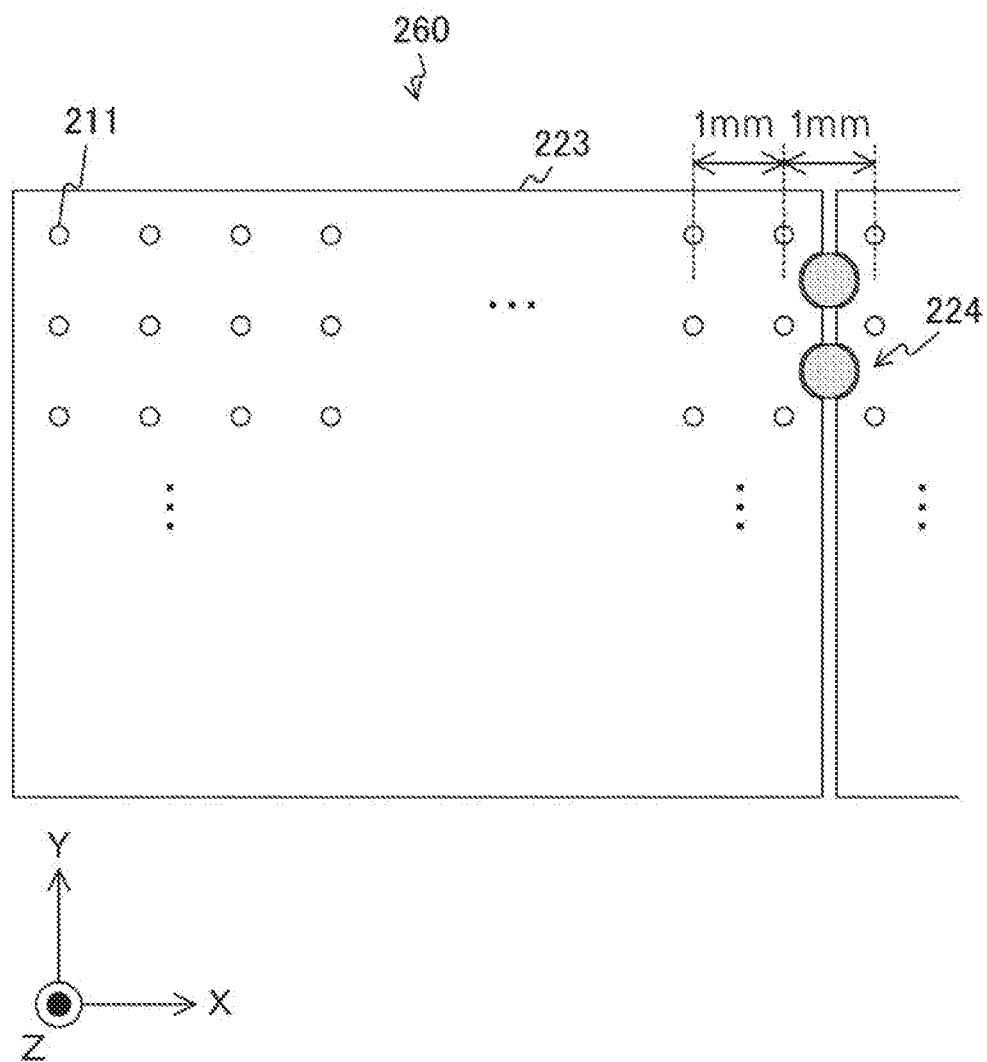
FIG. 9 is a top view of an example configuration of a display panel according to the second embodiment of the present technology.

FIG. 9 is a diagram showing an example configuration of a display panel according to the second embodiment of the present technology. The display panel 260 in the drawing differs from the display panel 210 described above with reference to FIG. 5, in including the recesses 224. In FIG. 9, the pixels 211 are arranged at a pitch of 1 mm. Note that, as shown in FIG. 9, the recesses 224 are preferably disposed between pixels 211. Even if the recesses 224 are relatively large, the recesses 224 can be disposed between pixels 211. In addition, as shown in FIG. 9, the pitch of the pixels 211 between which the space between adjacent panel substrates 223 exists is preferably 1 mm, which is the same as the pitch of the other pixels 211. In this manner, the spaces between the panel substrates 223 will not be visually recognized as joints.

Note that the recesses 224 are formed, and the precision of the positions of the pixels 211 relative to the recesses 224, and the precision of the shapes of the recesses 224 are increased. In this manner, the need to perform high-precision processing on the sizes of the side surfaces of the panel substrates 223 is eliminated. This is because the precision of the spaces between the adjacent panel substrates 223 is determined by the above mentioned precision of the positions of the pixels 211 relative to the recesses 224 or the like, and does not depend on the dimensional precision of the side surfaces of the panel substrates 223.

Figure 10:
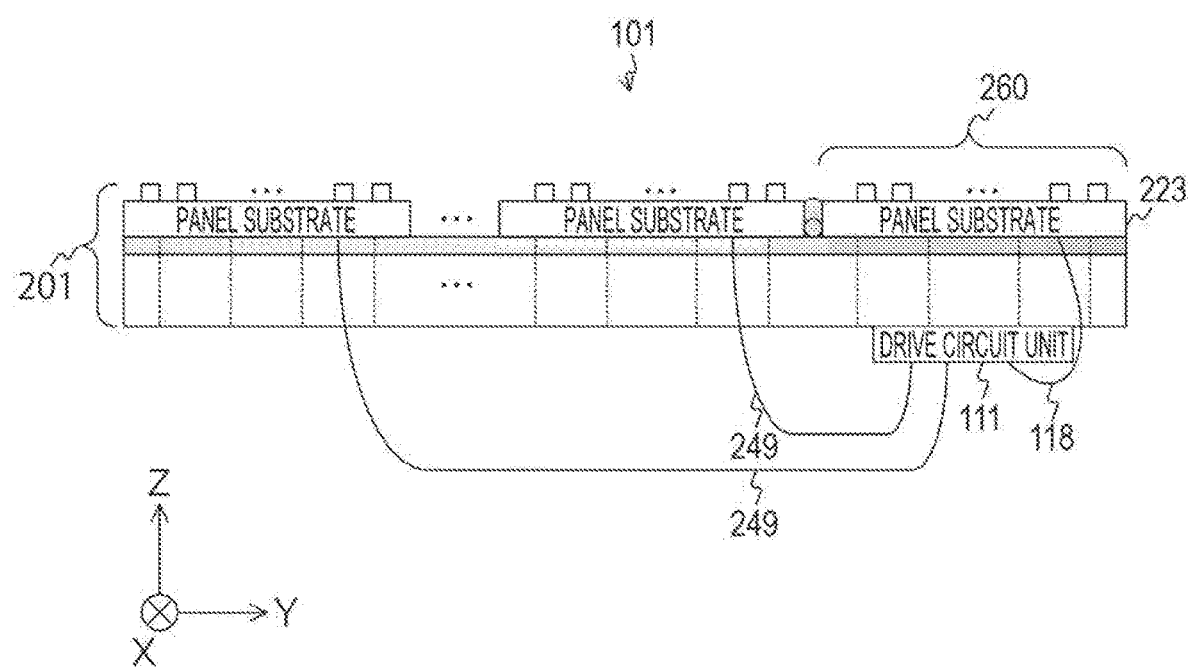
FIG. 10 is a cross-sectional view of the example configuration of the display apparatus according to the second embodiment of the present technology.

FIG. 10 is a cross-sectional view of the example configuration of the display apparatus according to the second embodiment of the present technology. The signal cable 118 connects the drive circuit unit 111 to the display panel 260 disposed on an upper end portion of the display unit 201. Meanwhile, the signal cables 249 connect the drive circuit unit 111 to the respective display panels 260. With these signal cables, electrical signals generated by the drive circuit unit 111 are transmitted to the display panels 260. These electrical signals include an image signal, a clock signal, and a power supply signal. The image signal is a signal that determines the luminance of light to be emitted from the pixels 211 of the display panels 260. The clock signal is a signal that determines the timing to transmit the image signal. The power supply signal is a signal for supplying power to the pixels 211 and the like of the display panels 260. Of these signals, the image signal is transmitted to the panel substrate 223 disposed on an upper end portion of the display unit 201 through the signal cable 119. After that, the image signal is transmitted to the adjacent panel substrate 223 through the above described recesses 224 and the space forming members 225. As this process is repeated, the image signal is transmitted to all the panel substrates 223. Meanwhile, the clock signal and the power supply signal are transmitted from the drive circuit unit 111 to all the panel substrates 223 through the signal cables 249.

Hereinafter, a signal to be transmitted through the space forming members 220 will be referred to as a first signal, and a signal to be transmitted through the members other than the space forming members 220 will be referred to as a second signal. In the second embodiment of the present technology, the image signal is a first signal, and the clock signal and the power supply signal are second signals. In this manner, transmission paths are changed depending on the types of signals. Note that the first signal is an example of the first signal of the claims. Each second signal is an example of the second signal of the claims. The image signal is an example of the image signal of the claims. The clock signal is an example of the clock signal of the claims. The power supply signal is an example of the power supply signal of the claims.

Referring now to FIG. 10, the relationship between these signals and a configuration of a display panel 260 is described.

Figure 11:
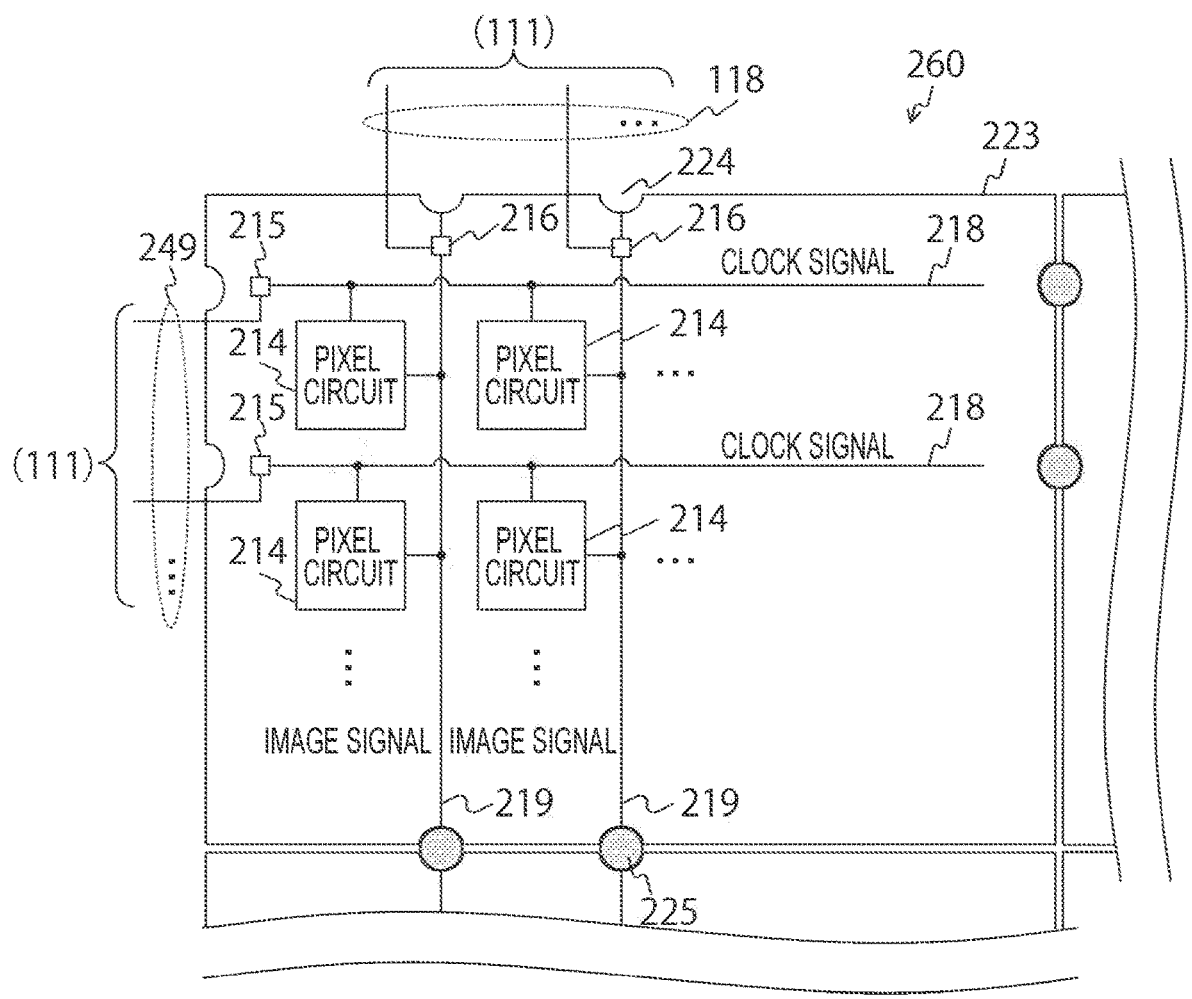
FIG. 11 is a block diagram showing an example configuration of a display panel according to the second embodiment of the present technology.

FIG. 11 is a block diagram showing an example configuration of a display panel according to the second embodiment of the present technology. The display panel 260 in the drawing includes pixel circuits 214, connectors 215 and 216, and electrical wiring lines 218 and 219. The pixel circuits 214 drive the pixels 211 (not shown). Each pixel circuit 214 acquires an image signal in synchronization with a clock signal, and drives the corresponding pixel 211 by applying the current corresponding to the image signal to the LED in the pixel 211. The luminance of light to be emitted by the pixels 211 is controlled by the pixel circuits 214. The connectors 215 and 216 connect a signal cable 249 or 118 to the panel substrate 223. The electrical wiring lines 218 and 219 transmit electrical signals. The electrical wiring lines 218 transmit the clock signal, and the electrical wiring lines 219 transmit the image signal. Other than that, electrical wiring lines that transmit a power supply signal (not shown) also exist on the panel substrate 223. Note that these electrical wiring lines may have similar configurations to the electrical wiring lines described above in the first embodiment of the present technology.

In FIG. 11, the image signal is transmitted from the drive circuit unit 111 to the electrical wiring lines 219 through the signal cable 118 and the connectors 216. The electrical wiring lines 219 are connected to the conductive coating films in the recesses 224 formed in upper and lower portions of the panel substrate 223. As the space forming members 225 are provided, the electrical wiring lines 219 are electrically connected to the adjacent panel substrate, and the signal is transmitted to the adjacent panel substrate. Meanwhile, the clock signal and the power supply signal are transmitted from the drive circuit unit 111 to the electrical wiring lines 218 through the signal cable 249 and the connectors 215. However, the electrical wiring lines 218 are not connected to the conductive coating films in the recesses 224. Therefore, these signals are not transmitted to any adjacent panel substrate.

The reason why the separate signal transmission paths are provided as above is described below. Of the pixel circuits 214 shown in FIG. 11, the pixel circuits 214 aligned in a vertical line are connected to an electrical wiring line 219 that transmits the image signal. In a case where such a signal is transmitted through a signal cable, the signal cable needs to have the same number of lines as the number of pixels aligned in a horizontal row in the display unit 201. In addition, the image signal has a relatively small current. Meanwhile, the clock signal and the power supply signal are connected to all the pixel circuits 214, and the flowing currents are relatively large. The recesses 224 and the space forming members 225 are designed to achieve electrical connections through contact, and the electrical resistances at these portions are relatively high. In view of this, the image signal is transmitted through the recesses 224 and the space forming members 225, so that the number of signal cables required is reduced. In addition, the clock signal and the power supply signal are transmitted not passing through the recesses 224 and the space forming members 225, so that any loss due to the above mentioned electrical resistances is avoided.

As an electrical signal is transmitted to adjacent panel substrates through the recesses 224 and the space forming members 225 in the above manner, the number of signal cables can be reduced. In addition, as the recesses 224 and the space forming members 225 are not used for transmission depending on the types of signals, a transmission path suitable for the characteristics of each signal can be used.

3. Modifications

Example where a Display Module is Formed

In the above described display apparatuses, display panels are arranged to form tiled-type display apparatuses. In a modification of an embodiment of the present technology, on the other hand, a larger display module is formed.

Figure 12:
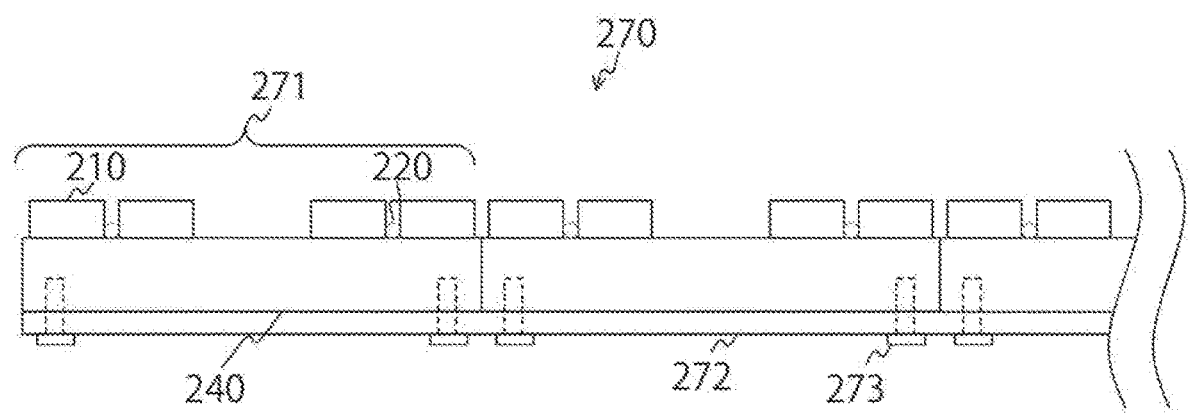
FIG. 12 is a cross-sectional view of an example configuration of a display module according to a modification of an embodiment of the present technology.

FIG. 12 is a cross-sectional view of an example configuration of a display module according to a modification of an embodiment of the present technology. The display module 270 in the drawing includes display units 271, a joining member 272, and attachment screws 273. Each display unit 271 is a small tiled-type display apparatus including display panels 210. The joining member 272 joins the display units 271 to one another, and may be formed with a substrate made of a metal, for example. The attachment screws secure the display units to the joining member.

Each display unit 271 includes display panels 210, space forming members 220, and a support substrate 240. This display unit 271 is equivalent to the above described display unit 200, and the spaces between the display panels 210 are formed by the space forming members 220. Note that the display module 270 is an example of the display module of the claims. The display units 271 are an example of the display units of the claims. The joining member 272 is an example of the joining member of the claims.

According to the modification of an embodiment of the present technology, even in a case where a display module is formed with display units joined to one another, spaces are formed between adjacent display panels by the space forming members 220 in each display unit. Thus, the precision of the spaces between adjacent display panels can be increased.

Example where Panel Substrates are in Surface
Contact with Space Forming Members The above described display panels use spherical space forming members. In a modification of an embodiment of the present technology, on the other hand, space forming members each having a surface are used.

Figure 13:
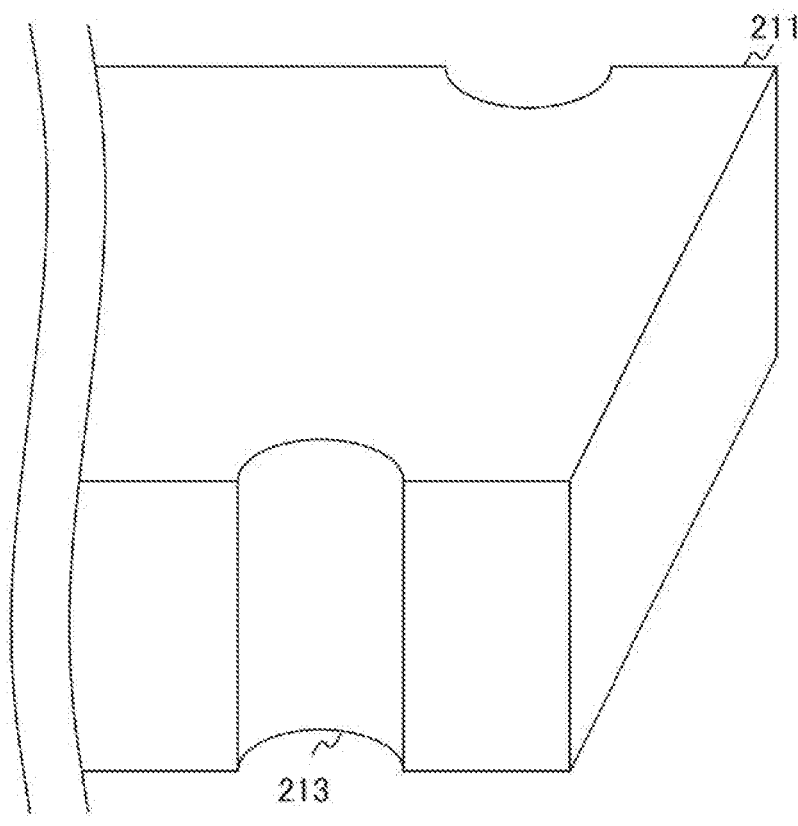
FIG. 13 is a diagram showing the configurations of a panel substrate and a space forming member according to a modification of an embodiment of the present technology.
Figure 13:
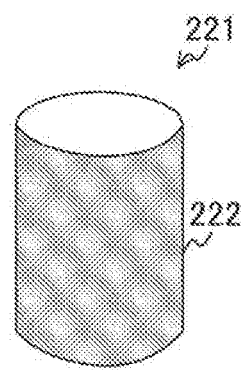

FIG. 13 is a diagram showing the configurations of a panel substrate and a space forming member according to the modification of an embodiment of the present technology. In the drawing, (a) is a perspective view of the configuration of a surface 213 to be in contact with a space forming member 221 in a panel substrate 212. In addition, in the drawing, (b) is a diagram showing the configuration of the space forming member 221.

The surface 213 is a surface that determines the position to be in contact with the space forming member 221 in the panel substrate 212. In addition, the space forming member 221 is a space forming member having a cylindrical shape. The side surface of this space forming member 221 is a surface 222 to be in contact with the surface 213. That is, the surface 213 and the surface 222 are brought into contact with each other. More preferably, the surface 213 of the panel substrate 212 is a curved surface, one of the surface 213 and the surface 222 of the space forming member 221 is a recess, and the other one of the surfaces 213 and 222 is a protrusion, as shown in FIG. 13. Thus, the two surfaces can engage with each other. Furthermore, the surface 213 and the surface 222 have arc-like shapes with curvature radii that are substantially equal to each other.

Thus, almost the entire surface 213 and almost the entire surface 222 are brought into contact with each other. As a result, a larger contact area can be achieved, compared with a contact area in a case where a panel substrate is in point contact with space forming members as described above in the first embodiment of the present technology. Note that, although, in the modification of an embodiment of the present technology, the surface 213 is a recess, and the surface 222 is a protrusion, the surface 213 may be a protrusion, and the surface 222 may be a recess. In addition, in FIG. 13, the surface 213 and the surface 222 have arc-like shapes with curvature radii that are substantially equal to each other. With the pitch of the pixels 211 being taken into consideration, the curvature radii are 1 mm or smaller.

The effect of such shapes is now described. In a case where the display unit 200 bends due to a change in the ambient temperature, a high stress is applied to the space forming members 221. Even in such a case each panel substrate 212 is in contact with space forming members 221 in large areas. Accordingly, deformation of the panel substrate 212 and the space forming members 221 is reduced, and the effect to limit decreases in the distance between the panel substrates 212 can be improved.

Note that the space forming members 221 preferably have such a shape as not to protrude from the display surface of each panel substrate 212. That is, in (b) in FIG. 13, the height of the space forming member 221 is preferably equal to or smaller than the thickness of the panel substrate 212. This is not to degrade display quality.

Example where all Electrical Signals are Transmitted Through Space Forming Members In the second embodiment of the present technology, only the signal image is transmitted through the space forming members. In a modification of an embodiment of the present technology, on the other hand, all the electrical signals are transmitted through space forming members.

Figure 14:
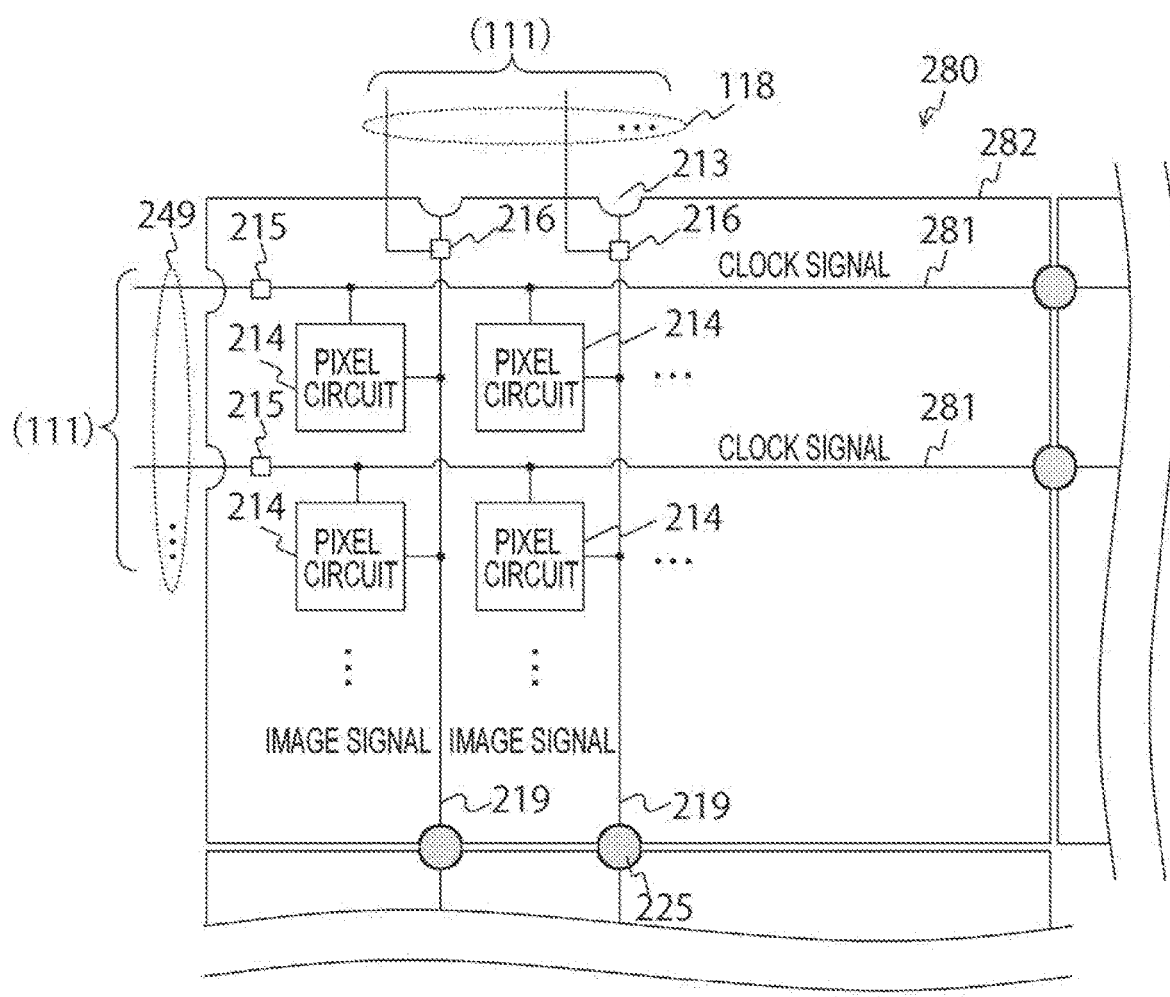
FIG. 14 is a block diagram showing an example configuration of a display panel according to a modification of an embodiment of the present technology.

FIG. 14 is a block diagram showing an example configuration of a display panel according to a modification of an embodiment of the present technology. The display panel 280 in the drawing differs from the display panel 260 described above with reference to FIG. 11, in using electrical wiring lines 281. The electrical wiring lines 281 transmit the clock signal. The electrical wiring lines 281 are connected to the conductive coating films in recesses 224 formed in right and left portions of the panel substrate 282. In addition to that, the electrical wiring lines that transmit the power supply signal are also connected to the conductive coating films in the recesses 224 (not shown). Other than the above, the configuration of the display panel 280 can be similar to the configuration of the display panel 260 shown in FIG. 11.

As described above, in the modification of an embodiment of the present technology, all the electrical signals can be transmitted through the space forming members 225.

Method of Manufacturing a Display Apparatus

Figure 15:
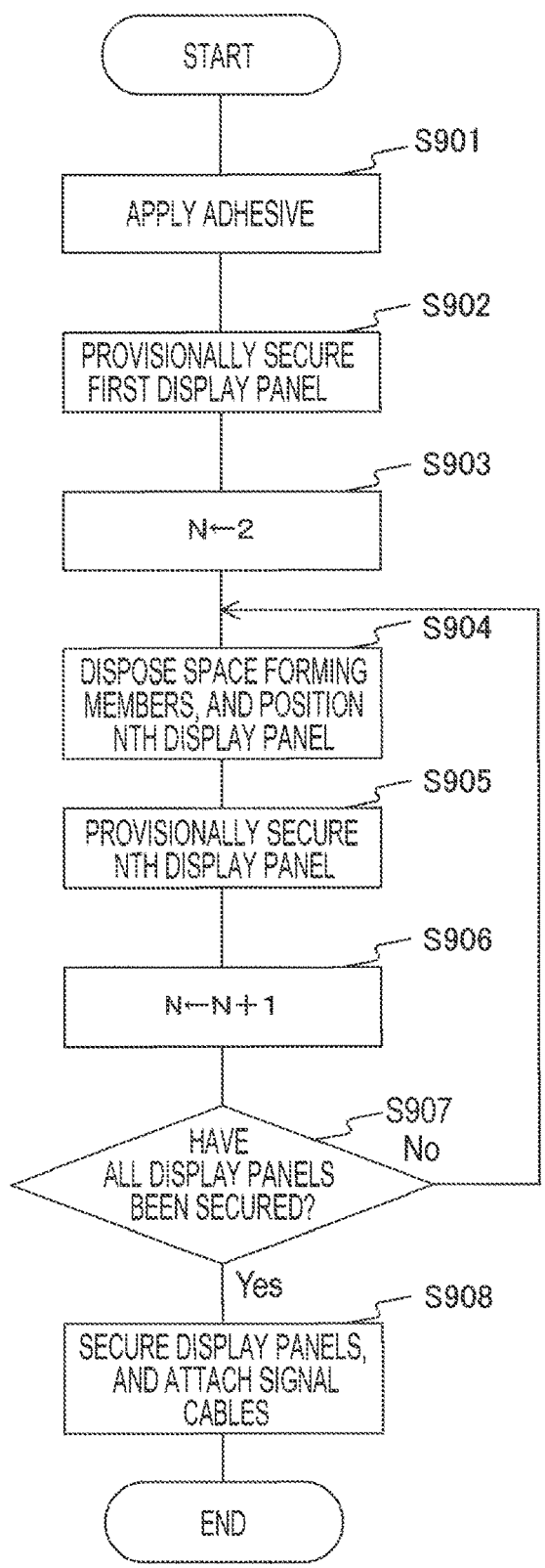
FIG. 15 is a flowchart showing the steps for manufacturing a display apparatus.

FIG. 15 is a flowchart showing the steps for manufacturing a display apparatus. First, an adhesive applying step is carried out to apply an adhesive 230 to a support substrate 240 (step S901). A first display panel positioning step is then carried out to dispose the first display panel 210 in a predetermined position on the support substrate 240, and a provisional securing step is carried out to secure the display panel 210 to the support substrate 240 (step S902). This provisional securing will be described later. A variable N is then set at an initial value "2" (step S903). Note that N is a value obtained by subtracting 1 from the number of the display panels 210 arranged on the support substrate 240. A space forming member positioning step is then carried out to arrange space forming members 220. In addition, a second display panel positioning step is also carried out to position and dispose the Nth display panel 210 (step S904). A provisional securing step is then carried out to secure the Nth display panel 210 (step S905). N is then incremented (step S906).

In a case where N+1 is equal to the number of the display panels 210 to be arranged, or all the display panels 210 have been secured (Yes in step S907), the process moves on to step S908. In a case where not all the display panels have been provisionally secured (No in step S907), the steps in step S904 and thereafter are again carried out. In step S908, a securing step is carried out to harden the entire adhesive 230, and secure the provisionally-secured display panels 210 to the support substrate 240. After that, signal cables, a drive circuit unit 110, and the like are connected (step S908). Note that, prior to those steps, a connecting step is carried out to arrange and electrically connect pixels 211 onto the panel substrates 212 of the display panels 210

A method of manufacturing a display apparatus 100 is now described, with reference to drawings. Note that, in the example case described below, display panels 210 have recesses 224, and spherical space forming members 220 are used.

Figure 16:
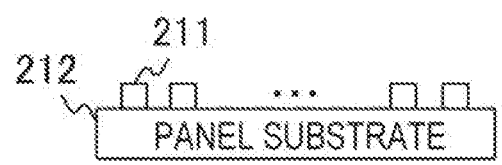
FIG. 16 is a diagram illustrating a connecting step.

FIG. 16 is a diagram illustrating the connecting step. Pixels 211 are arranged on the panel substrates 212 of the display panels 210, and the electrical wiring lines formed on the panel substrate 212 are electrically connected to the terminal portions of the pixels 211. These connections can be formed by soldering, for example.

Figure 17:
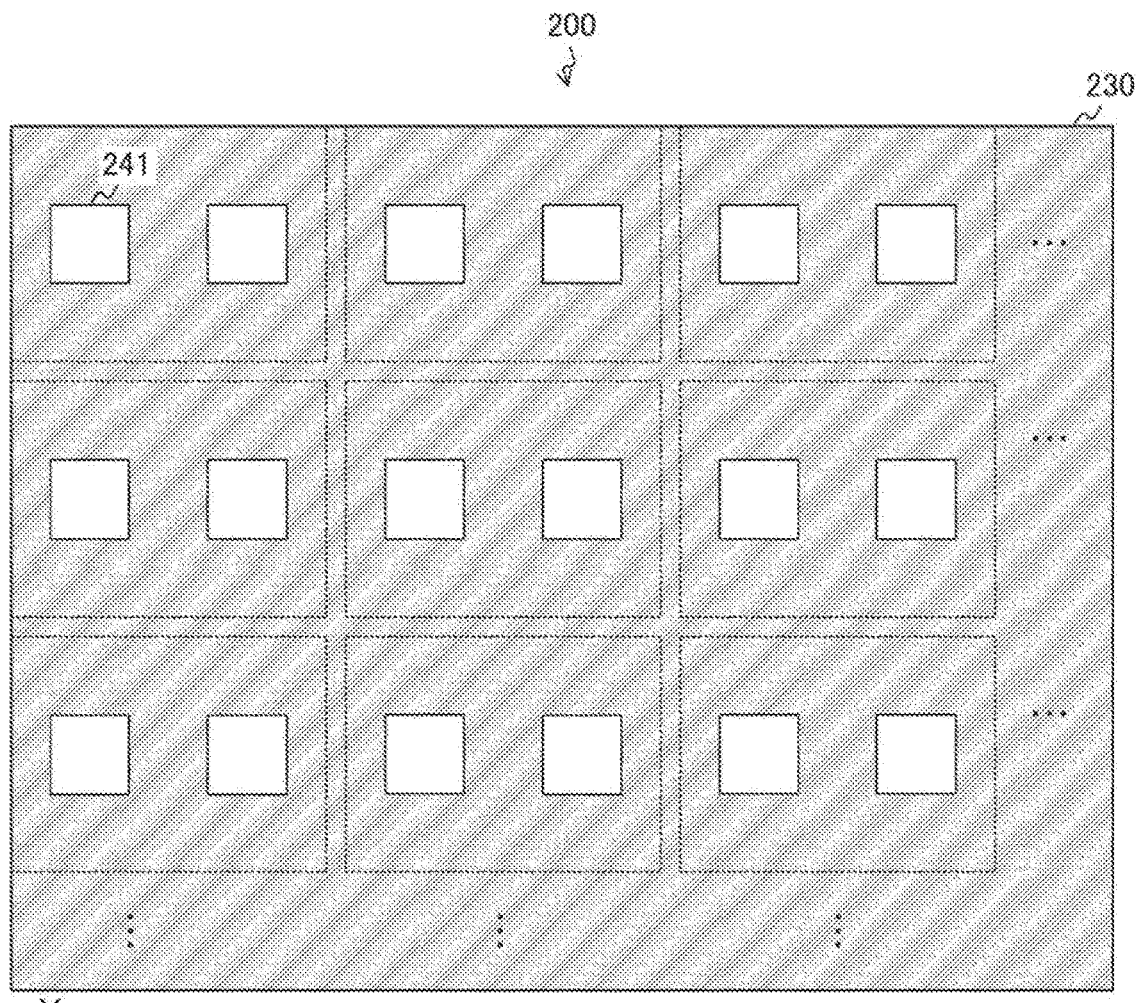
FIG. 17 is a diagram illustrating an adhesive applying step.
Figure 17:
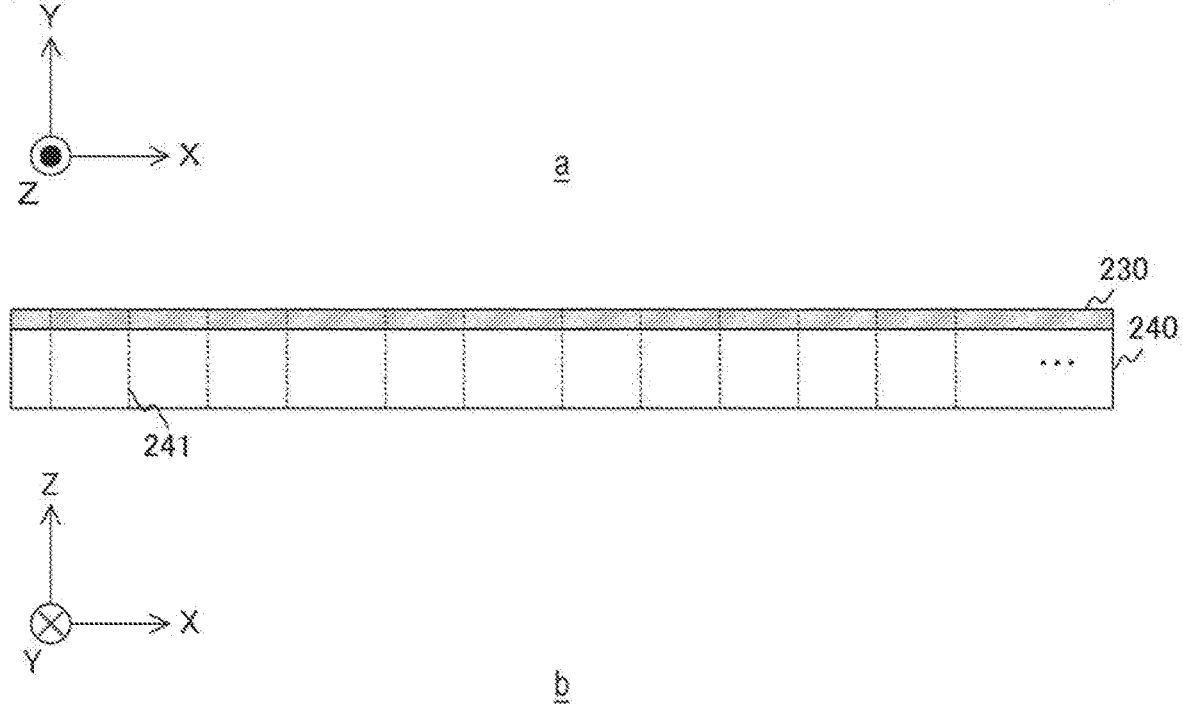

FIG. 17 is a diagram illustrating the adhesive applying step. The adhesive 230 is applied to the entire front surface of the support substrate 240. The adhesive 230 can be applied by screen printing, for example.

Figure 18:
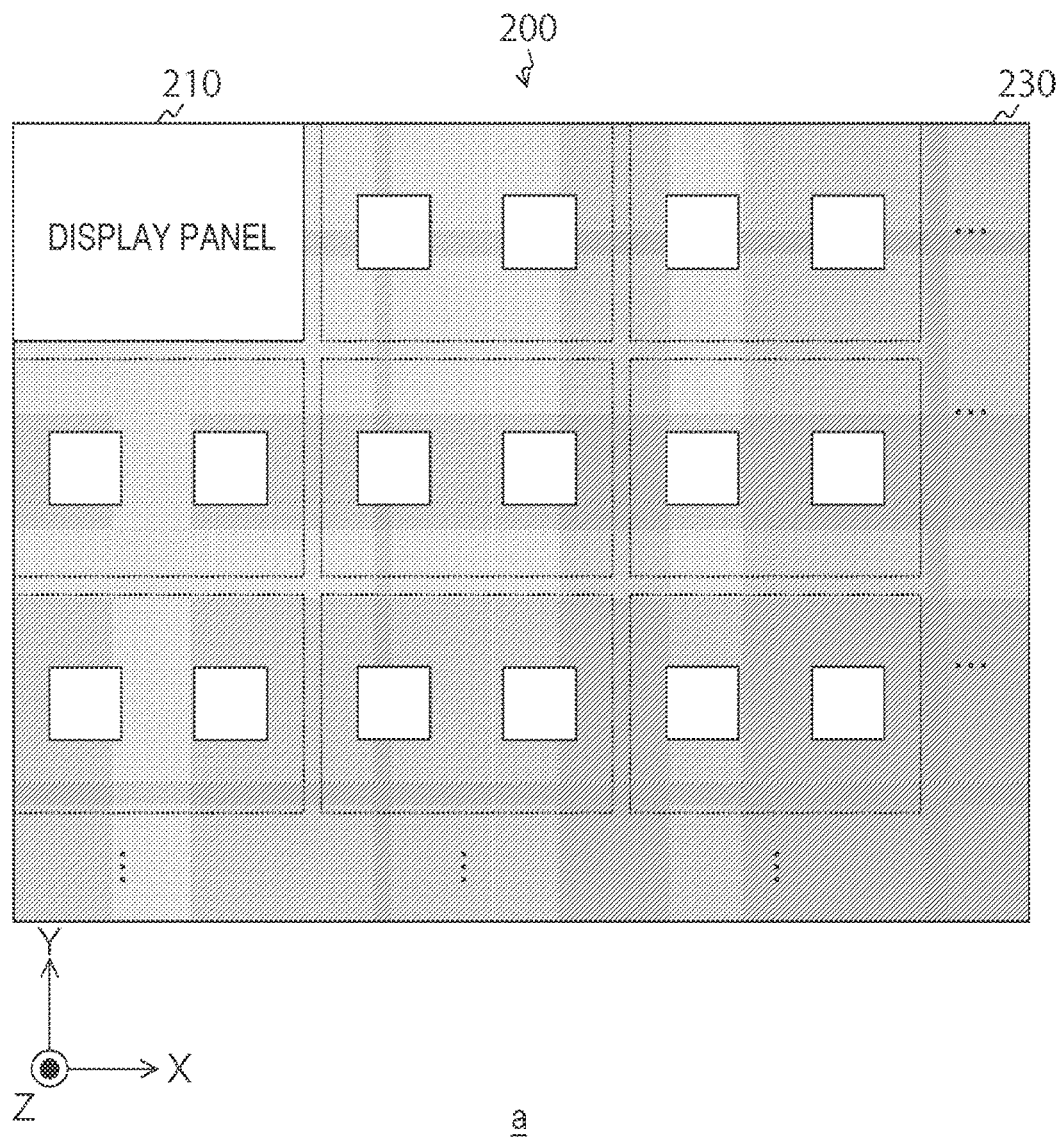
FIG. 18 is a diagram illustrating a first display panel positioning step and a provisional securing step.
Figure 18:
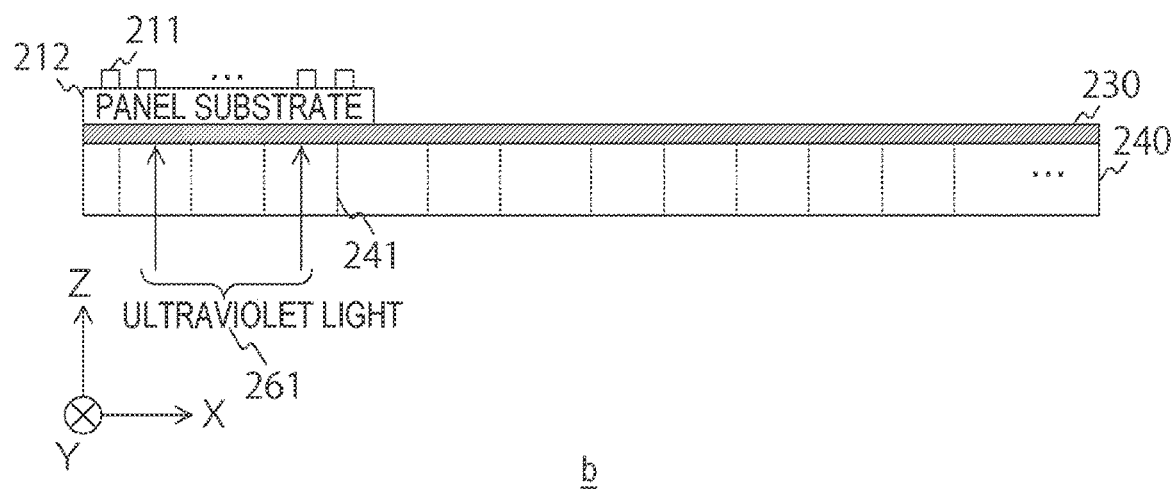

FIG. 18 is a diagram illustrating the first display panel positioning step and a provisional securing step. The first display panel 210 is disposed in a predetermined position on the support substrate 240 having the adhesive 230 applied thereto. In FIG. 18, the first display panel 210 is disposed in the upper left corner of the support substrate 240. After that, ultraviolet light 261 is emitted to the openings 241 located immediately below the display panel 210. Note that the ultraviolet light 261 is emitted from the back surface side of the support substrate 240. With this, the adhesive 230 in the vicinities of the openings 241 is selectively hardened, and the display panel 210 is provisionally secured.

Figure 19:
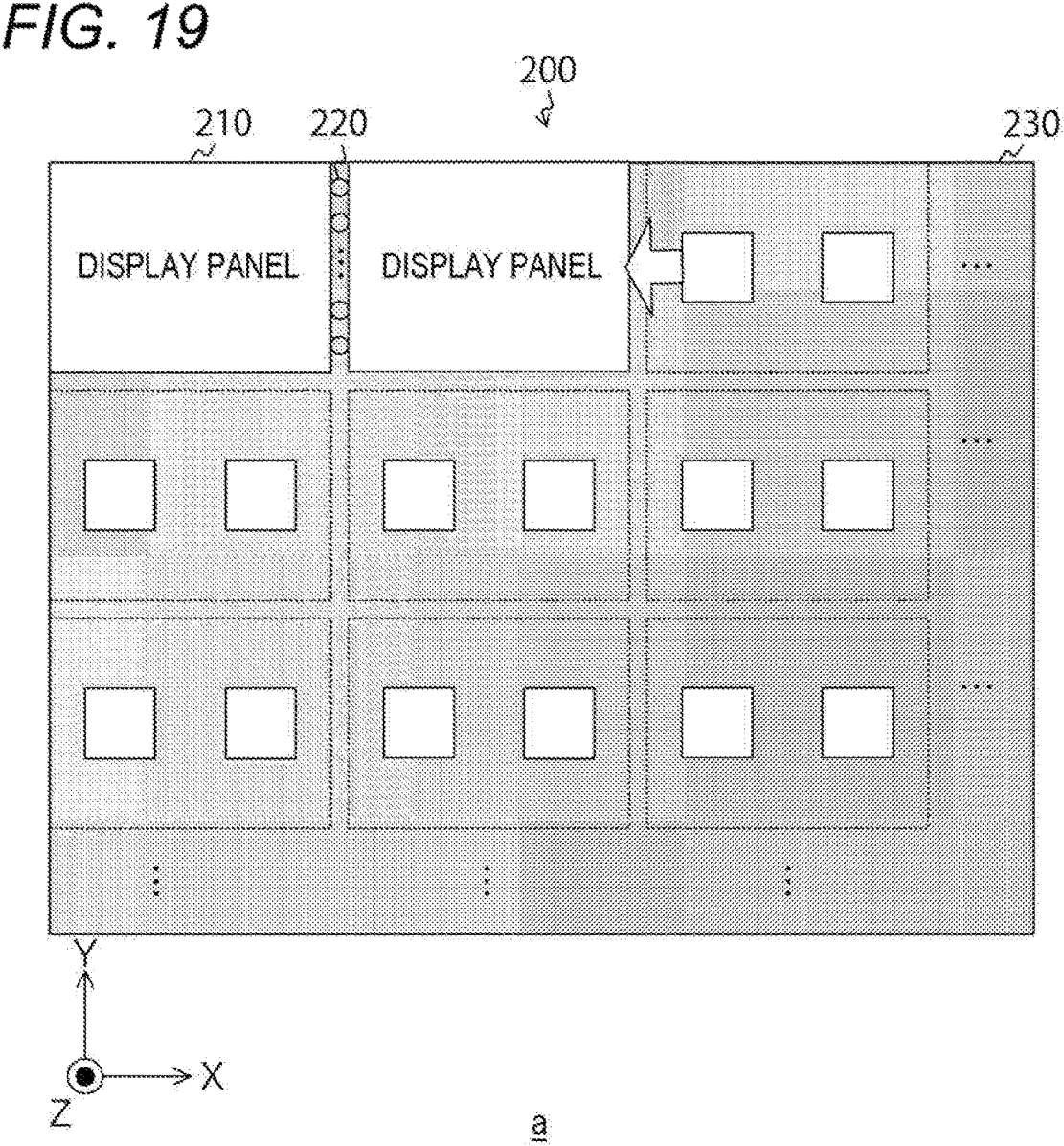
FIG. 19 is a diagram illustrating a space forming member positioning step and a second display panel positioning step.
Figure 19:
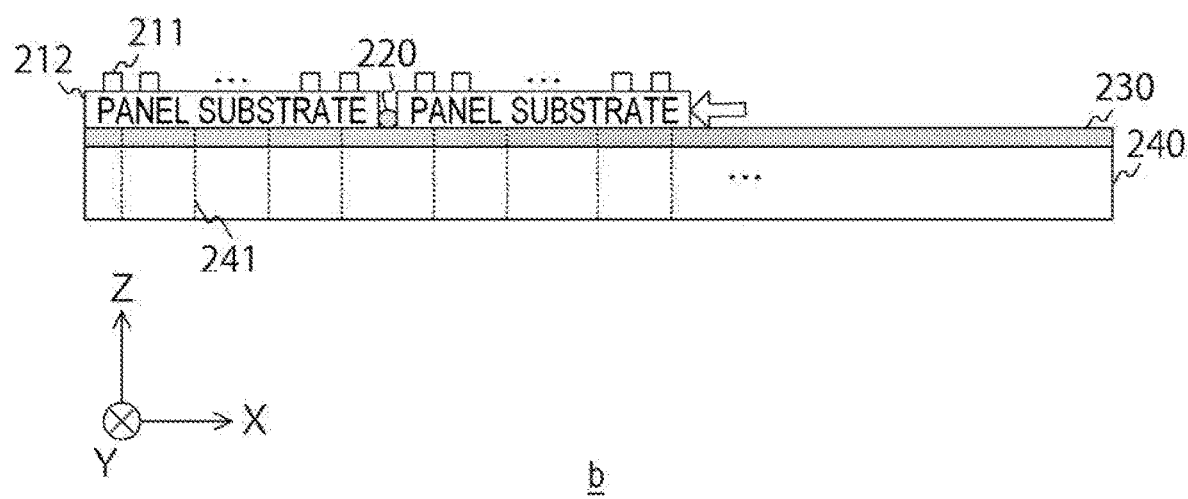

FIG. 19 is a diagram illustrating the space forming member positioning step and the second display panel positioning step. First, space forming members 220 are disposed between the first display panel 210 and the second display panel 210 to be placed. At this stage, the space forming members 220 are disposed in the positions of recesses 224. In addition, the second display panel 210 is disposed in position, having recesses 224 facing the disposed space forming members 220. The space forming members 220 are used in positioning the second display panel 210, and therefore, any high-precision positioning device or the like is not required in disposing the display panels 210.

After the second display panel 210 is mounted, stress is applied to the second display panel 210 from above and from the opposite direction from the first display panel 210, as indicated by an arrow in FIG. 19. As a result, the space between the two display panels is adjusted to a predetermined distance. At this stage, the adhesive 230 might overflow from the space between the display panels 210, and the space forming members 220 might shift in position. However, as the space forming members 220 are spherical space forming members, the overflowing adhesive 230 flows into gaps between the space forming members 220 and the panel substrates, and thus, the space forming members 220 will not shift in position.

Figure 20:
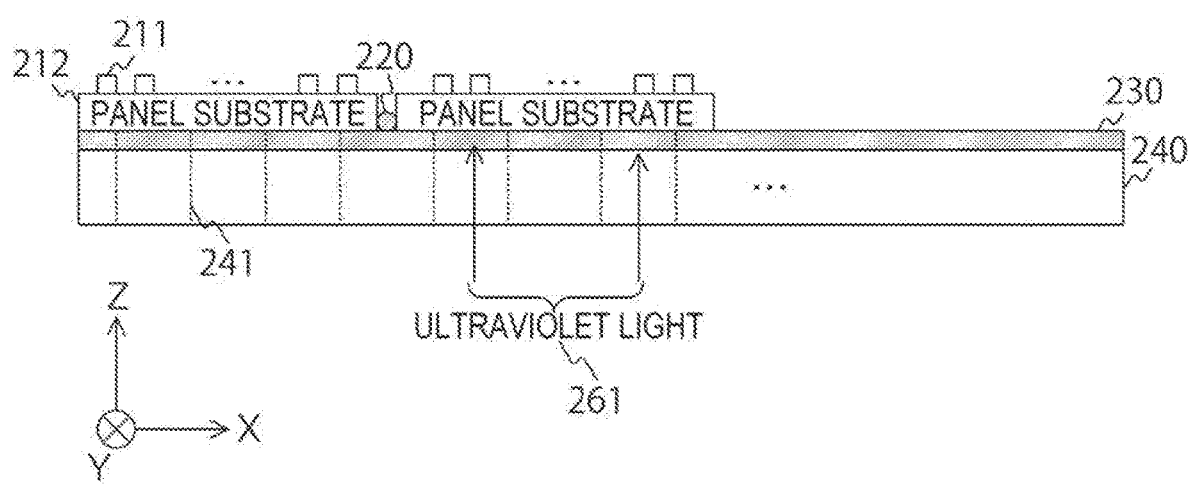
FIG. 20 is a diagram illustrating a provisional securing step for the second display panel 210.

FIG. 20 is a diagram illustrating the provisional securing step for the second display panel 210. While the above mentioned stress is applied to the second display panel 210 mounted on the support substrate, the ultraviolet light 261 is emitted to the openings 241 located immediately below the second display panel 210. With this, the second display panel 210 is provisionally secured.

Figure 21:
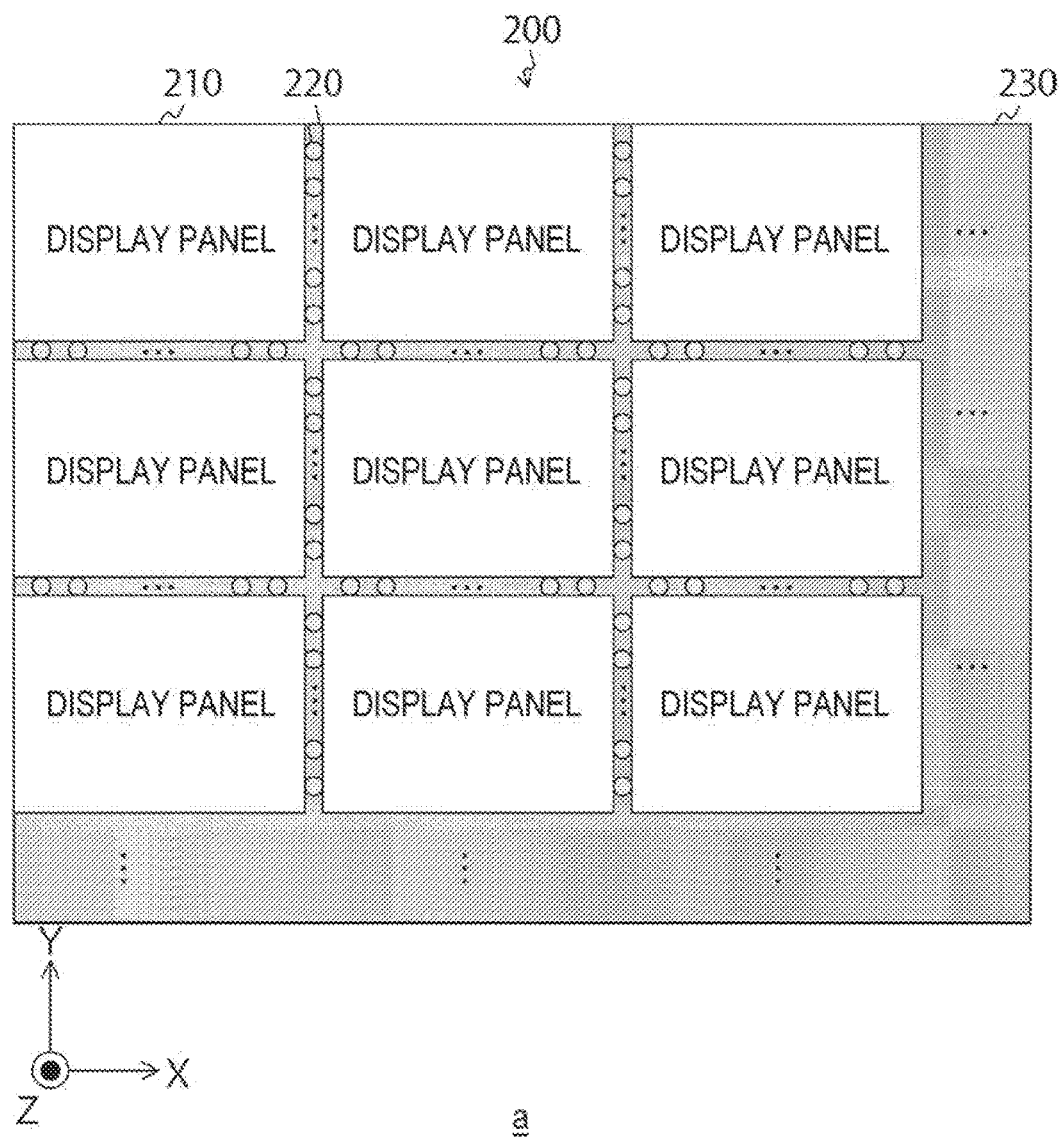
FIG. 21 is a diagram illustrating a securing step.
Figure 21:
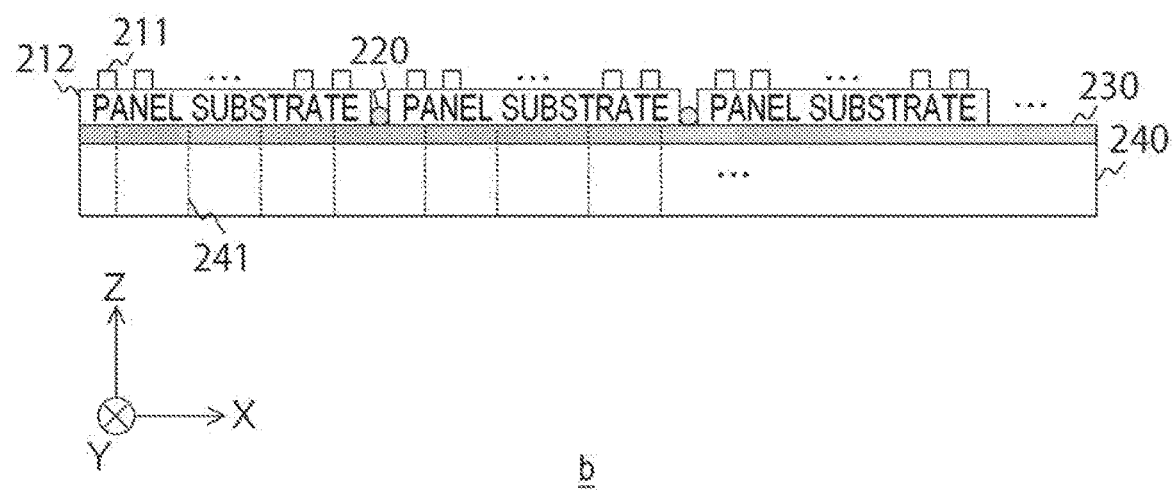

FIG. 21 is a diagram illustrating the securing step. After all the display panels 210 are provisionally secured, heat is applied to the entire configuration, and the unhardened adhesive 230 is hardened. After that, the drive circuit unit 110 is provided, and the signal cable 119 and the like are connected. Through these steps, the display apparatus 100 is manufactured.

Method of Forming Recesses

A method of forming the recesses 224 may be a method of forming recesses by polishing the side surfaces of the panel substrates 212, for example, or may be a method of forming recesses by forming holes in a substrate from which panel substrates are to be formed, and cutting along the lines passing through the holes. The latter method is described below, with reference to a drawing. Note that, in the description below, the recesses 224 each have an arc-like shape when seen from above the display panels 260, and have a conductive coating film. In addition, the panel substrates 223 may be substrates formed with a glass-containing epoxy resin.

Figure 22:
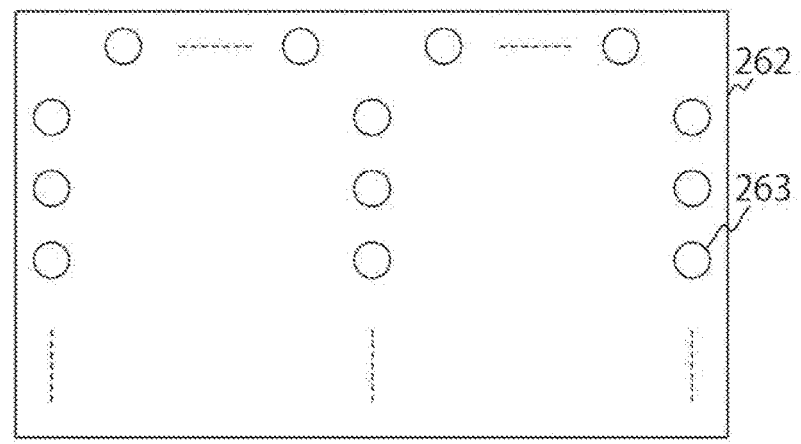
FIG. 22 is a diagram illustrating a recess forming process.
Figure 22:
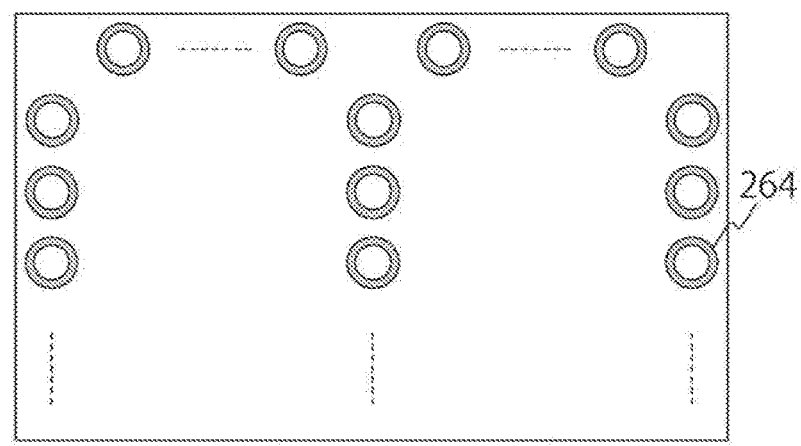
Figure 22:
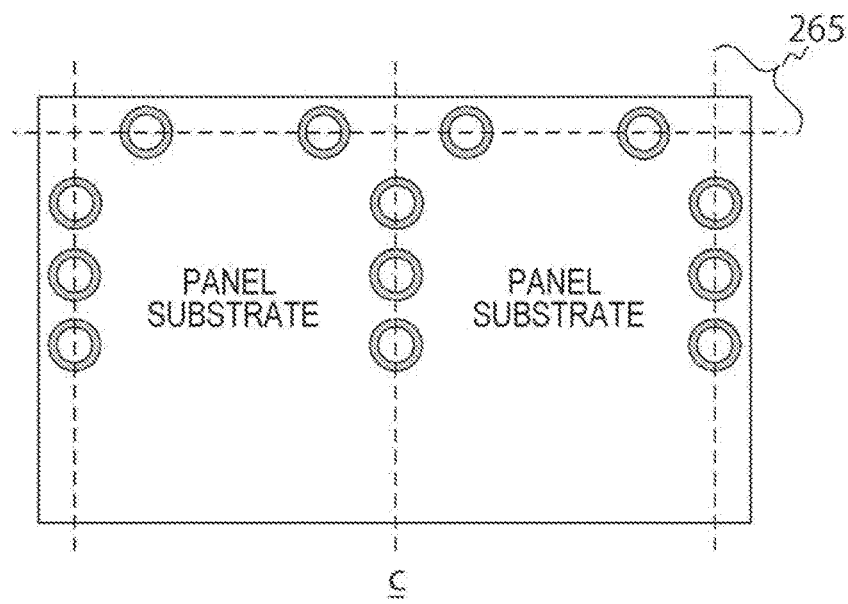

FIG. 22 is a diagram illustrating the recess forming process. First, a hole forming step is described. In the drawing, (a) is a diagram illustrating the hole forming step. Holes 263 are formed in a glass-containing epoxy resin substrate 262 from which the panel substrates 223 are to be formed. In this stage, the holes 263 are formed in the positions in which the recesses 224 are to be formed.

Next, a plating step is described. In FIG. 22, (b) is a diagram illustrating the plating step. Plating is performed on the inside and the periphery of each hole 264, so that coating films 264 of a metal, such as copper or gold, are formed. Prior to this plating step, electrical wiring lines to be electrically connected to the recesses 224, such as a wiring pattern formed with copper foil, need to be formed on the glass-containing epoxy resin substrate 262.

Next, a cutting step is described. In FIG. 22, (c) is a diagram illustrating the cutting step. The glass-containing epoxy resin substrate 262 having the metal coating films formed thereon by plating is cut into the panel substrates 223. In this stage, the cutting is performed along lines 265 extending along the central portions of the holes 263. Through these steps, the panel substrates 223 having the recesses 224 are manufactured.

As described so far, according to an embodiment of the present technology, the space forming members 220 or 225 form spaces between adjacent display panels, and accordingly, the precision of the spaces between the adjacent display panels can be made higher. As a result, a tiled-type display apparatus with high display quality can be manufactured.

Note that the above described embodiments are examples for embodying the present technology, and there is a correspondence relationship between the subject matter of the embodiments and the subject matter of the inventions disclosed in the claims. Likewise, the subject matter of the claims corresponds to the matter under the same names as the subject matter of the claims in the embodiments of the present technology. However, the present technology is not limited to the embodiments, and various changes can be made to the embodiments without departing from the scope of the technology.

In addition, the processing procedures described above in the embodiments may be regarded as a method involving the series of these procedures, or may be regarded as a program for causing a computer to carry out the series of these procedures or a recording medium storing the program. This recording medium may be a compact disc (CD), a mini disc (MD), a digital versatile disc (DVD), a memory card, or a Blu-ray (registered trademark) Disc, for example.

Note that the advantageous effects described in this specification are merely examples, and the advantageous effects of the present technology are not limited to them and may further include other effects.

Note that the present technology may also be embodied in the configurations described below.

(1) A Display Apparatus Including:
a plurality of display members having pixels arranged thereon; and
a space forming member that is disposed between the display members, and forms a space between the display members.

(2) The display apparatus of (1), wherein the pitch of the pixels between which the space between adjacent ones of the display members exists is substantially equal to the pitch of the pixels within the display members.

(3) The display apparatus of (1) or (2), wherein the space forming member is in contact with the display members at points or surfaces.

(4) The display apparatus of (3), wherein the surfaces at which the space forming member is in contact with the display members are curved surfaces when seen from display surfaces of the display members, and one joining surface forms a recess while the other joining surface forms a protrusion.

(5) The display apparatus of (4), wherein the surfaces at which the space forming member is in contact with the display members have arc-like shapes with substantially the same curvature radii when seen from display surfaces of the display members.

(6) The display apparatus of (5), wherein the surfaces at which the space forming member is in contact with the display members have arc-like shapes with curvature radii not greater than 1 mm, when seen from display surfaces of the display members.

(7) The display apparatus of any of (4) through (6), wherein the surfaces at which the space forming member is in contact with the display members are formed between the pixels arranged on outermost peripheries of the display members.

(8) The display apparatus of any of (1) through (7), wherein resin is provided between the display members having the space formed in between by the space forming member.

(9) The display apparatus of any of (1) through (8), wherein the space forming member does not protrude from display surfaces of the display members.

(10) The display apparatus of any of (1) through (9), wherein the space forming member has a thermal conduction member.

(11) The display apparatus of any of (1) through (10), wherein the space forming member has a conductive member, and transmits an electrical signal to be supplied to the display members.

(12) The display apparatus of (11), wherein the display members perform displaying in accordance with a first signal transmitted through the space forming member, and a second signal transmitted through a member other than the space forming member.

(13) The display apparatus of (12), wherein the first signal includes one of an image signal, a clock signal, and a power supply signal for the display members.

(14) The display apparatus of (13), further including a supporting member that supports the display members, wherein the supporting member includes a drive circuit unit that generates the first signal and the second signal for the display members.

(15) The display apparatus of (14), wherein the second signal is transmitted from the drive circuit unit to each of the display members.

(16) A display module including:
a plurality of display units each including:
a plurality of display members having pixels arranged thereon;
a space forming member that is disposed between the display members, and forms a space between the display members; and
a supporting member that supports the display members; and
a joining member that joins the supporting members of the display units to each other, the joining member including a thermal conduction portion.

(17) A display member including:
a display surface having pixels arranged thereon, the pixels constituting the display member; and
a side surface of the display surface, a plurality of recesses being formed in the side surface, the recesses being to be brought into contact with a space forming member that forms a space between display members.

(18) The display member of (17), wherein the recesses each have a conductive member, and transmit an electrical signal to be supplied from the space forming member to the display member.

(19) The display member of (18), which performs displaying in accordance with a first signal transmitted through the recesses, and a second signal transmitted through a member other than the recesses.

(20) The display member of (17), wherein the recesses of the display member are in contact with the space forming member at surfaces.

(21) A method of manufacturing a display apparatus, including:
a connecting step of electrically connecting to a wiring pattern formed on a display member, to supply power to pixels arranged on the display member;
an adhesive applying step of applying an adhesive to a support substrate on which a plurality of display members having the pixels arranged thereon are to be mounted, the adhesive designed for bonding the display members having the pixels connected thereto to the support substrate;
a first display member positioning step of positioning the first display member having the pixels arranged thereon on the support substrate having the adhesive applied thereto;
a provisional securing step of securing the display members to the support substrate by hardening predetermined portions of the adhesive bonding the arranged panel substrates to the support substrate;
a space forming member positioning step of disposing a space forming member in a predetermined position on the support substrate having the display members arranged thereon, the space forming member forming a space between the display members;
a second display member positioning step of disposing the second and later display members in adjacent positions on the display members having the space forming member disposed in between; and
a securing step of hardening the adhesive bonding the arranged display members to the support substrate.

REFERENCE SIGNS LIST 100, 101 Display apparatus
110, 111 Drive circuit unit
118, 119, 249 Signal cable
200, 201 Display unit
210, 260, 280 Display panel
211 Pixel
212, 223, 282 Panel substrate
213 Surface
214 Pixel circuit
215, 216 Connector
218, 219 Electrical wiring line
220, 221 Space forming member
222 Surface
224 Recess
225 Space forming member
226 Particle
227 Coating film
228 Display surface
229 Side surface
230 Adhesive
231 Sealing resin
240 Support substrate
241 Opening
262 Glass-containing epoxy resin substrate
263 Hole 264 Coating film
265 Line
270 Display module
271 Display unit
272 Joining member
281 Electrical wiring line

The invention claimed is:

1. A display apparatus, comprising:
a plurality of display members, wherein each display member of the plurality of display members comprises:
a substrate; and
a plurality of pixels arranged on the substrate; and
a plurality of space forming members between substrates of adjacent display members of the plurality of display members, wherein
at least one side surface of the substrate of each display member of the adjacent display members comprises a plurality of recesses, and
each recess of the plurality of recesses is in direct contact with a respective space forming member of the plurality of space forming members and has an arc-like shape.

2. The display apparatus according to claim 1, wherein a first pitch of the plurality of pixels of the adjacent display members between which a uniform space exists is substantially equal to a second pitch of the plurality of pixels within the plurality of display members.

3. The display apparatus according to claim 1, wherein the plurality of space forming members is in contact with the plurality of display members at one of a plurality of points.

4. The display apparatus according to claim 3, wherein
the at least one side surface at which a space forming member of the plurality of space forming members is in contact with the substrate is a curved surface as seen from a display surface of the plurality of display members, and
a joining surface of a plurality of joining surfaces of the plurality of space forming members forms a protrusion.

5. The display apparatus according to claim 4, wherein the at least one side surface of the substrate of each display member of the plurality of display members and the plurality of joining surfaces have arc-like shapes with substantially same curvature radii as seen from the display surface of the plurality of display members.

6. The display apparatus according to claim 5, wherein the at least one side surface of the substrate of each display member of the plurality of display members has arc-like shape with curvature radii less than or equal to 1 mm, as seen from the display surface of the plurality of display members.

7. The display apparatus according to claim 4, wherein
the at least one side surface at which the plurality of space forming members is in contact with the substrate is between a set of pixels of the plurality of pixels, and
the set of pixels is on a plurality of outermost peripheries of the plurality of display members.

8. The display apparatus according to claim 1, further comprising a resin between the plurality of display members in a uniform space maintained by the plurality of space forming members.

9. The display apparatus according to claim 1, wherein the plurality of space forming members does not protrude from display surfaces of the plurality of display members.

10. The display apparatus according to claim 1, wherein the plurality of space forming members comprises a thermal conduction member.

11. The display apparatus according to claim 1, wherein the plurality of display members is configured to display based on a signal transmitted through a supporting member.

12. The display apparatus according to claim 11, wherein the signal includes at least one of an image signal, a clock signal, or a power supply signal for the plurality of display members.

13. The display apparatus according to claim 12, further comprising
the supporting member configured to support the plurality of display members,
wherein the supporting member includes a drive circuit, and
the drive circuit is configured to generate the signal for the plurality of display members.

14. The display apparatus according to claim 13, wherein the signal is transmitted from the drive circuit to each display member of the plurality of display members.

15. A display module, comprising:
a plurality of display units, each display unit of the plurality of display units including:
a plurality of display members, wherein each display member of the plurality of display members comprises:
a substrate; and
a plurality of pixels arranged on the substrate;
a plurality of space forming members between substrates of adjacent display members of the plurality of display members, wherein
at least one side surface of the substrate of each display member of the adjacent display members comprises a plurality of recesses, and
each recess of the plurality of recesses is in direct contact with a respective space forming member of the plurality of space forming members and has an arc-like shape;
a supporting member of a plurality of supporting members configured to support the plurality of display members; and
a joining member configured to join the plurality of supporting members of the plurality of display units to each other, wherein the joining member includes a thermal conduction portion.

16. A display member, comprising:
a substrate comprising a display surface; and
a plurality of pixels arranged on the display surface, wherein
at least one side surface of the substrate comprises a plurality of recesses,
each recess of the plurality of recesses is in direct contact with a respective space forming member of a plurality of space forming members and has an arc-like shape, and
the plurality of space forming members is between substrates of the display member and an adjacent display member.

17. The display member according to claim 16, wherein
each recess of the plurality of recesses comprises a conductive member, and
each recess of the plurality of recesses is configured to transmit a first signal supplied from the plurality of space forming members to the display member.

18. The display member according to claim 17, wherein
the display member is configured to display based on the first signal and a second signal,
the first signal is an image signal transmitted through the plurality of recesses, and the second signal is one of a clock signal or a power supply signal transmitted through a supporting member,
the supporting member includes a drive circuit, and
the drive circuit is configured to generate the second signal for the display member.

* * * * *